(12) United States Patent
Cunningham et al.

(10) Patent No.: US 11,907,408 B2
(45) Date of Patent: Feb. 20, 2024

(54) ENCRYPTION AND DECRYPTION FOR A MULTI-TILE PROCESSING UNIT

(71) Applicant: Graphcore Limited, Bristol (GB)

(72) Inventors: Graham Cunningham, Chippenham (GB); Daniel Wilkinson, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 17/215,746

(22) Filed: Mar. 29, 2021

(65) Prior Publication Data
US 2022/0083695 A1    Mar. 17, 2022

(51) Int. Cl.
| | |
|---|---|
| *G06F 21/72* | (2013.01) |
| *G06F 21/78* | (2013.01) |
| *H04L 9/06* | (2006.01) |
| *H04L 9/14* | (2006.01) |
| *H04L 9/08* | (2006.01) |
| *G06F 3/06* | (2006.01) |
| *H04L 9/32* | (2006.01) |

(52) U.S. Cl.
CPC ............ *G06F 21/72* (2013.01); *G06F 3/0623* (2013.01); *G06F 3/0659* (2013.01); *G06F 3/0683* (2013.01); *G06F 21/78* (2013.01); *H04L 9/0618* (2013.01); *H04L 9/0631* (2013.01); *H04L 9/0894* (2013.01); *H04L 9/14* (2013.01); *H04L 9/3242* (2013.01)

(58) Field of Classification Search
CPC ........ G06F 21/72; G06F 21/78; G06F 3/0623; G06F 3/0659; G06F 3/0683; H04L 9/0618; H04L 9/0631; H04L 9/0894; H04L 9/14; H04L 9/3242
See application file for complete search history.

(56) References Cited

U.S. PATENT DOCUMENTS

| | | | | |
|---|---|---|---|---|
| 2005/0071651 | A1* | 3/2005 | Aguilar, Jr. | ........... G06F 21/602 713/189 |
| 2019/0156043 | A1* | 5/2019 | Chhabra | ................. G06F 21/78 |
| 2019/0236022 | A1* | 8/2019 | Gopal | ................... G06F 21/602 |

OTHER PUBLICATIONS

Petition for Retroactive Foreign Filing License Under 37 CFR § 5.25 and MPEP § 140 Patent Material for UK Patent Application No. 2010823.9 filed Jul. 14, 2020, filed with U.S. Patent and Trademark Office on Feb. 17, 2021; 87 pages.
Decision on Petition issued by U.S. Patent and Trademark Office mailed Jan. 3, 2023, 6 pages.
Renewed Petition for Retroactive Foreign Filing License under 37 CFR 5.25 filed on Mar. 3, 2023.

(Continued)

*Primary Examiner* — Hee K Song
(74) *Attorney, Agent, or Firm* — HAYNES AND BOONE, LLP

(57) ABSTRACT

A device comprising a processing unit having a plurality of processors is provided. At least one encryption unit is provided as part of the device for encrypting data written by the processors to external storage and decrypting data read from that storage. The processors are divided into different sets, with state information held in the encryption unit for performing encryption/decryption operations for requests for different sets of processors. This enables interleaved read completions or write requests from different sets of processors to be handled by the encryption unit, since associated state information for each set of processors is independently maintained.

24 Claims, 13 Drawing Sheets

(56) References Cited

OTHER PUBLICATIONS

Decision on Renewed Petition Pursuant to 37 CFR 5.25 Seeking a Retroactive License for Foreign Filing under 35 U.S.C. 184, dated May 10, 2023.
Renewed Petition for Retroactive Foreign Filing License under 37 CFR 5.25 filed on Sep. 19, 2023.
Decision on Renewed Petition Pursuant to 37 CFR 5.25 Seeking a Retroactive License for Foreign Filing under 35 U.S.C. 184, dated Aug. 30, 2023.
Decision on Renewed Petition Pursuant to 37 CFR 5.25 Seeking a Retroactive License for Foreign Filing under 35 U.S.C. 184, dated Oct. 6, 2023.

* cited by examiner

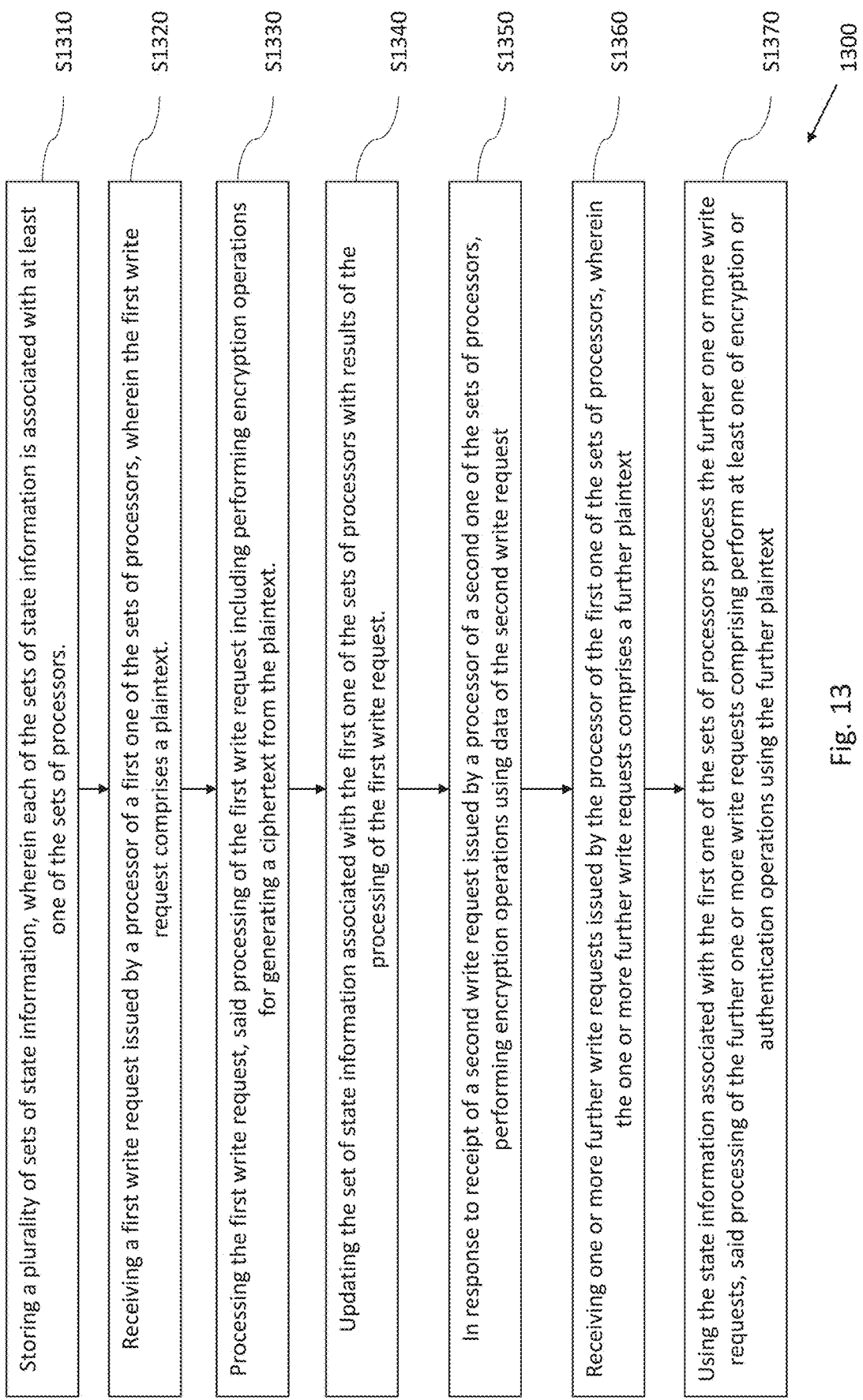

ENCRYPTION AND DECRYPTION FOR A MULTI-TILE PROCESSING UNIT

TECHNICAL FIELD

The present disclosure relates to a device comprising a processing unit and at least one encryption unit, and in particular to the encryption and decryption of data transferred between processors of the processing unit and storage external to the processing unit.

BACKGROUND

Parallelism in computing takes different forms. Program fragments may be organised to execute concurrently (where they overlap in time but may share execution resources) or in parallel where they execute on different resources possibly at the same time.

Parallelism in computing can be achieved in a number of ways, such as by means of an array of multiple interconnected processor tiles, or a mufti-threaded processing unit, or indeed a mufti-tile array in which each tile comprises a multi-threaded processing unit.

When parallelism is achieved by means of a processing unit comprising an array of multiple tiles on the same chip (or chips in the same integrated circuit package), each tile comprises its own separate respective processing unit with local memory (including program memory and data memory). Thus separate portions of program code can be run concurrently on different tiles. The tiles are connected together via an on-chip interconnect, which enables the code run on the different tiles to communicate between tiles. In some cases, the processing unit on each tile may take the form of a barrel-threaded processing unit (or other multi-threaded processing unit). Each tile may have a set of contexts and an execution pipeline such that each tile can run multiple interleaved threads concurrently.

When running machine learning applications on a multi-tile processing unit, it may be desirable to protect the confidentiality of the workloads executed on that processing unit and the confidentially of the results of the processing carried out using those workloads. Suitable encryption hardware may be used for this purpose. It is also desirable to perform authentication checks for workloads read into the processing unit so as to provide an integrity guarantee that the processing unit is operating on the correct data. The encryption hardware may also be used for this purpose.

SUMMARY

It is proposed to use an encryption unit to perform encryption and decryption of data exchanged between tiles of a mufti-tile processing unit and storage external to that processing unit. However, there is the possibility that the messages used to carry data for one processor may become interleaved with messages used to carry data for another processor. For example, two different processors may each issue a read request to read data from external storage. In response to the read requests, sets of read completions are returned to each processor. If these read completions are interleaved when they reach the encryption hardware, the read completions may require reordering before they can be processed by the encryption hardware. However, performing reordering of all read completions returned to tiles across a multi-tile processor may require a prohibitively large reorder buffer. The same problem applies to write requests for writing data from the processors to the external storage.

One possible solution may be to apply the constraint that only one tile of the processing unit may issue a read/write request at any one time. However, this may significantly reduce the bandwidth of data transfer between the processing unit and the external storage.

According to a first aspect, there is provided a device comprising: a processing unit comprising a plurality of sets of processors, wherein each of the processors is operable to issue read requests to read data from storage external to the processing unit and to receive in response, read completions comprising said data; and at least one encryption unit comprising a memory operable to store a plurality of sets of state information, wherein each set of state information is associated with at least one of the sets of processors, wherein the at least one encryption unit comprises processing circuitry configured to: receive a first read completion for delivery to a processor of a first one of the sets of processors, wherein the first read completion comprises a ciphertext; process the first read completion, said processing including decryption operations for generating a plaintext from the ciphertext; store as state information associated with the first one of the sets of processors, data generated from the processing of the first read completion; subsequently, in response to a second read completion for delivery to a processor of a second one of the sets of processors, perform decryption operations using data of the second read completion; subsequently, receive a further one or more read completions for delivery to the processor of the first one of the sets of processors, wherein the one or more further read completions comprises a further ciphertext; and using the state information associated with the first one of the sets of processors, process the further one or more read completions, said processing of the further one or more read completions comprising performing at least one of decryption or authentication operations for the further ciphertext.

Therefore, the processor tiles are divided into different sets, with different sets of tiles being associated with different state information stored in the encryption unit. This enables the encryption unit to handle interleaved read completions. For example, suppose a first read completion for delivery to a first set of processors is received at the encryption unit. That first read completion contains a first ciphertext. The encryption unit performs authentication and decryption operations using the first ciphertext and stores state information resulting from those operations. That state information may then be loaded and used to perform the remaining decryption and authentication operations when further ciphertext is received at the encryption unit in a further read completion for delivery to the first set of processors, even when other read completions for delivery to other sets of processors are received in the meantime.

Therefore, by providing sets of state information associated with different sets of processors, the requirement to re-order read completions for delivery to different sets of processors may be eliminated. Furthermore, by associating the sets of state information with different sets of processors, it is not required to store a separate set of state information for each individual processor, which may require a prohibitively large set of state information to be held in the encryption unit.

In some embodiments, the at least one of decryption or authentication operations comprise authentication operations, the authentication operations comprising operations for generating a message authentication code associated with the ciphertext and the further ciphertext.

In some embodiments, the state information used for performing the authentication operations comprises a partial hash, wherein the processing of the first read completion comprises generating the partial hash using the ciphertext.

In some embodiments, the at least one of decryption or authentication operations comprises decryption operations, the decryption operations comprising generating a further plaintext from the further ciphertext.

In some embodiments, the state information comprises an initialisation vector used for performing the decryption operations.

In some embodiments, the processing circuitry of the at least one encryption unit is configured to, when decrypting each ciphertext block received in the first read completion and one or more further read completions, update the initialisation vector using a counter.

In some embodiments, one or more of the sets of state information are each associated with a plurality of the sets of processors.

In some embodiments, for each of a group of processors associated with a same set of state information, the processors of the respective group are configured to implement a constraint such that only one of the processors of the respective group may have an outstanding read request open at any one time.

In some embodiments, the device comprises a plurality of exchange circuits, wherein each of the exchange circuits is associated with a set of processors and is configured to enforce the constraint for each of its respective set of processors by granting permission to the processors of its associated set to transmit read requests.

According to a second aspect, there is provided a device comprising: a processing unit comprising a plurality of sets of processors, wherein each of the processors is operable to issue write requests to write data to storage external to the processing unit; and at least one encryption unit comprising a memory operable to store a plurality of sets of state information, wherein each of the sets of state information are associated with at least one of the sets of processors, wherein the at least one encryption unit comprises processing circuitry configured to: receive a first write request issued by a processor of a first one of the sets of processors, wherein the first write request comprises a plaintext; process the first write request, said processing of the first write request including performing encryption operations for generating a ciphertext from the plaintext; store as state information associated with the first one of the sets of processors, data generated from the processing of the first write request; subsequently, in response to receipt of a second write request issued by a processor of a second one of the sets of processors, perform encryption operations using data of the second write request; subsequently, receive one or more further write requests issued by the processor of the first one of the sets of processors, wherein the one or more further write requests comprises a further plaintext; and using the state information associated with the first one of the sets of processors, process the further one or more write requests, said processing of the further one or more write requests comprising performing at least one of encryption or authentication operations using the further plaintext.

As with the read completions, the association of different sets of tiles with different state information allows for the handling of interleaved write requests. A first write request is received at the encryption unit from a first set of processors. That first write request contains a first plaintext. The encryption unit performs the encryption and authentication operations for the first plaintext and stores state information resulting from those operations. That state information may then be loaded and used to perform the remaining encryption and authentications operations when the further plaintext is received at the encryption unit in a further one or more write requests originating from the first set of processors, even when other write requests associated with other sets of processors are received in the meantime.

By having sets of state information associated with different sets of processors, the requirement to re-order write requests originating from different sets of processors may be eliminated.

Furthermore, by associating the sets of state information with different sets of processors, it is not required to have a set of state information for each individual processor, which may require a prohibitively large set of state information to be held in the encryption unit.

The separately claimed devices and methods for handling read competitions and write requests represent closely related alternative solutions to the same technical problem.

In some embodiments, the at least one of encryption or authentication operations comprise authentication operations, the authentication operations comprising operations for generating a message authentication code associated with the plaintext and the further plaintext.

In some embodiments, the state information used for performing the authentication operations comprises a partial hash, wherein the processing of the first read completion comprises generating the partial hash using the ciphertext.

In some embodiments, the at least one of encryption or authentication operations comprises encryption operations, the encryption operations comprising generating a further ciphertext from the further plaintext.

In some embodiments, the state information comprises an initialisation vector used or performing the encryption operations.

In some embodiments, the processing circuitry of the at least one encryption unit is configured to when encrypting each plaintext block received in the first write request and the one or more further write requests, update the initialisation vector used for encrypting the respective plaintext block using a counter.

In some embodiments, one or more of the sets of state information are each associated with a plurality of the sets of processors.

In some embodiments, for each of the at least one set of processors associated with a same set of state information, the respective processors are configured to implement a constraint such that only one of the processors of the respective at least one set of processors may issue write requests comprising a plaintext block at any one time.

In some embodiments, the device comprises a plurality of exchange circuits, wherein each of the exchange circuits is associated with one of the sets of processors and is configured to enforce the constraint for its associated set of processors by granting permission to the processors of its associated set to transmit the write requests.

In some embodiments, the device is a subsystem for acting as a work accelerator to a host system coupled to the device, wherein the storage external to the processing unit is memory of the host system.

According to a third aspect, there is provided a method for decrypting data read from a storage external to a processing unit comprising a plurality of sets of processors, the method comprising: storing a plurality of sets of state information, wherein each of the sets of state information is associated with at least one of the sets of processors; receiving a first read completion for delivery to a processor of a first one of the sets of processors, wherein the first read completion comprises a ciphertext; processing the first read completion, said processing including decryption operations for generating a plaintext from the ciphertext; updating the set of state information associated with the first one of the sets of processors with results of the processing of the first read completion; subsequently, in response to a second read completion for delivery to a processor of a second one of the sets of processors, performing decryption operations using data of the second read completion; subsequently, receiving a further one or more read completions for delivery to the processor of the first one of the sets of processors, wherein the one or more further read completions comprises a further ciphertext; and using the state information associated with the first one of the sets of processors, processing the further one or more read completions, said processing of the further one or more read completions comprising performing at least one of decryption or authentication operations using the further ciphertext.

In some embodiments, the at least one of decryption or authentication operations comprise authentication operations, the authentication operations comprising operations for generating a message authentication code associated with the ciphertext and the further ciphertext.

In some embodiments, the state information used for performing the authentication operations comprises a partial hash, wherein the processing of the first read completion comprises generating the partial hash using the ciphertext.

In some embodiments, the at least one of decryption or authentication operations comprises decryption operations, the decryption operations comprising generating a further plaintext from the further ciphertext.

In some embodiments, the state information comprises an initialisation vector used for performing the decryption operations.

In some embodiments, the method comprises, when decrypting each ciphertext block received in the first read completion and one or more further read completions, updating the initialisation vector using a counter.

In some embodiments, one or more of the sets of state information are each associated with a plurality of the sets of processors.

In some embodiments, the method comprises: for each of a group of processors associated with a same set of state information, implementing a constraint such that only one of the processors of the respective group may have an outstanding read request open at any one time.

In some embodiments, the device comprises a plurality of exchange circuits, wherein each of the exchange circuits is associated with a set of processors and is configured to enforce the constraint for each of its respective set of processors by granting permission to the processors of its associated set to transmit read requests.

According to a fourth, aspect, there is provided a method for encrypting data to be written to a storage external to a processing unit comprising a plurality of sets of processors, the method comprising: storing a plurality of sets of state information, wherein each of the sets of state information is associated with at least one of the sets of processors; receiving a first write request issued by a processor of a first one of the sets of processors, wherein the first write request comprises a plaintext; processing the first write request, said processing of the first write request including performing encryption operations for generating a ciphertext from the plaintext; updating the set of state information associated with the first one of the sets of processors with results of the processing of the first write request; subsequently, in response to receipt of a second write request issued by a processor of a second one of the sets of processors, performing encryption operations using data of the second write request; subsequently, receiving one or more further write requests issued by the processor of the first one of the sets of processors, wherein the one or more further write requests comprises a further plaintext; and using the state information associated with the first one of the sets of processors, processing the further one or more write requests, said processing of the further one or more write requests comprising performing at least one of encryption or authentication operations using the further plaintext.

In some embodiments, the at least one of encryption or authentication operations comprise authentication operations, the authentication operations comprising operations for generating a message authentication code associated with the plaintext and the further plaintext.

In some embodiments, the state information used for performing the authentication operations comprises a partial hash, wherein the processing of the first read completion comprises generating the partial hash using the ciphertext.

In some embodiments, the at least one of encryption or authentication operations comprises encryption operations, the encryption operations comprising generating a further ciphertext from the further plaintext.

In some embodiments, the state information comprises an initialisation vector used for performing the encryption operations.

In some embodiments, the method comprises, when encrypting each plaintext block received in the first write request and the one or more further write requests, updating the initialisation vector used for encrypting the respective plaintext block using a counter.

In some embodiments, one or more of the sets of state information are each associated with a plurality of the sets of processors.

In some embodiments, the method comprises, for each of the at least one set of processors associated with a same set of state information, implementing a constraint such that only one of the processors of the respective at least one set of processors may issue write requests comprising a plaintext block at any one time.

In some embodiments, the device comprises a plurality of exchange circuits, wherein each of the exchange circuits is associated with one of the sets of processors and is configured to enforce the constraint for its associated set of processors by granting permission to the processors of its associated set to transmit the write requests.

According to a fifth aspect, there is provided a computer program comprising computer readable instructions, which when executed by at least one processor of at least one encryption unit, cause a method according to the third aspect to be carried out.

According to a sixth aspect, there is provided a non-transitory computer readable storage medium storing a computer program according to the fifth aspect.

According to a seventh aspect, there is provided a computer program comprising computer readable instructions, which when executed by at least one processor of at least one encryption unit, cause a method according to the third aspect to be carried out.

According to a eighth aspect, there is provided a non-transitory computer readable storage medium storing a computer program according to the seventh.

BRIEF DESCRIPTION OF DRAWINGS

For a better understanding of the present invention and to show how the same may be carried into effect reference will now be made by way of example to the following drawings.

FIG. 13 is a method for handling interleaved write requests using state information associated with different sets of tiles.

DETAILED DESCRIPTION

The present disclosure relates to a device having at least one encryption unit and a processing unit comprising a plurality of processors.

An example multi-tile processing unit 2 is described with reference to FIG. 1. This example such processing unit 2 may take the form of the IPU (Intelligence Processing Unit), so named to denote its adaptivity to machine learning applications. The IPU is described in more detail in U.S. application Ser. No. 15/275,834, which is incorporated by reference.

Figure 1:
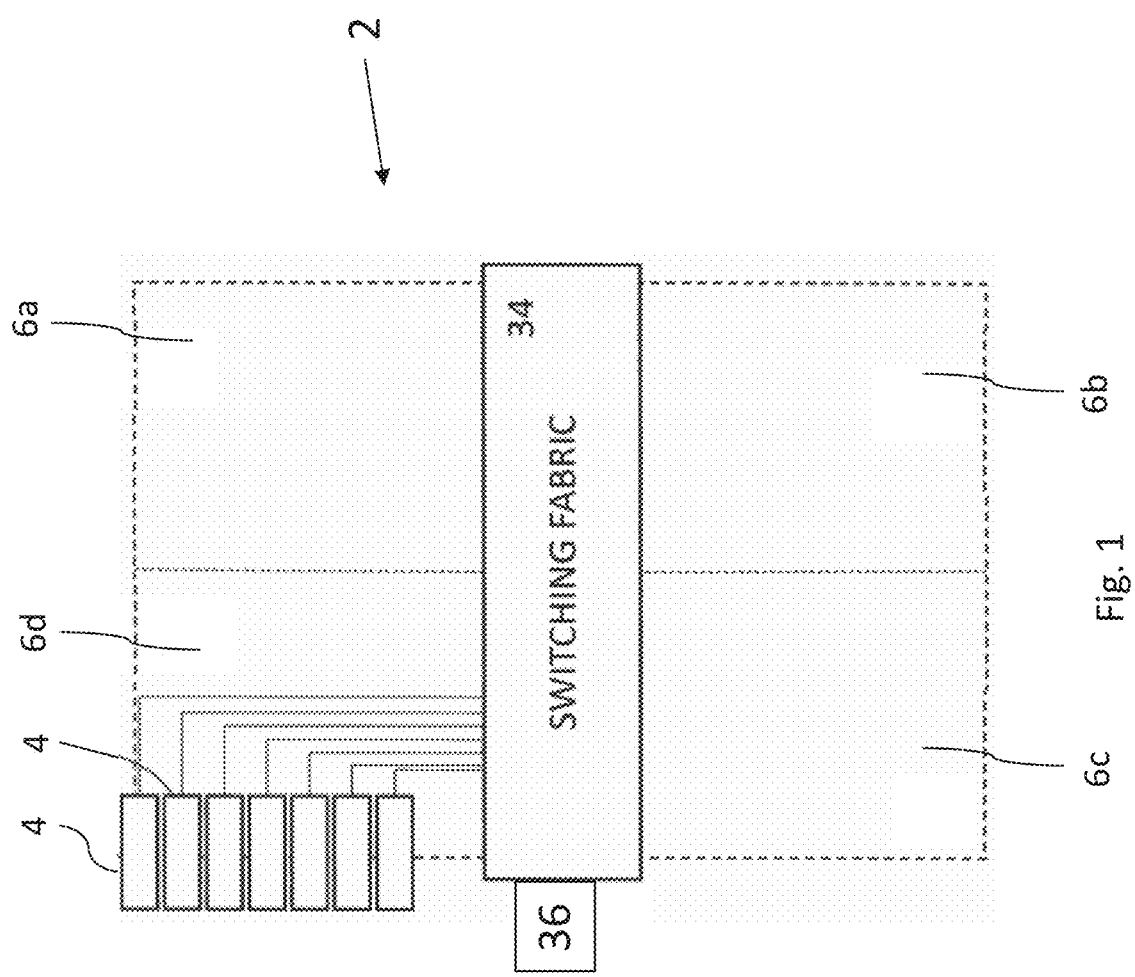
FIG. 1 illustrates an example of a processing unit comprising a plurality of processor tiles.

FIG. 1 illustrates schematically the architecture of the example processing unit 2. The processing unit 2 comprises an array 6 of multiple processor tiles 4 and an interconnect 34 connecting between the tiles 4. The processing unit 2 may be implemented alone or as one of multiple dies packaged in the same IC package. The interconnect 34 may also be referred to herein as the "exchange fabric" 34, as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4. Each tile 4 has its own local memory (described later). The tiles 4 do not share memory.

The processing unit 2 receives work from a host (not shown), which is connected to the processing unit 2 via one of the chip-to-host links implemented on an integrated circuit (i.e. chip) to which the processing unit 2 belongs. The work takes the form of input data to be processed by the processing unit 2. When providing the work, the host may access a computer, which is architected as a single processing unit 2 or a group of multiple interconnected processing units 2, depending on the workload from the host application.

The processing unit 2 comprises a switching fabric 34 to which all tiles 4 and links are connected by sets of connection wires, the switching fabric being stateless, i.e. having no program visible state. Each set of connection wires is fixed end to end. In this embodiment, a set comprises 32 data wires plus control wires, e.g. a valid bit. Each set can carry a 32-bit data packet, but note herein that the word "packet" denotes a set of bits representing a datum (sometimes referred to herein as a data item), perhaps with one or more valid bit. Each set of connection wires is pipelined and comprises a series of temporary stores, e.g. latches or flip flops, which hold datum for a clock cycle before releasing it to the next store. Time of travel along each wire is determined by these temporary stores, each one using up a clock cycle of time in a path between any two points. In this way, data exchange between tiles 4 may be conducted on a time deterministic basis.

By sending data between tiles 4 in a time deterministic manner, the "packets" may be sent without destination identifiers, which would permit an intended recipient to be uniquely identified. The packets may, however, include headers indicating at least one direction of travel through the switching fabric 34. The time deterministic exchange of data packets is explained in more detail in earlier application U.S. patent application Ser. No. 15/886,315, which is incorporated by reference.

Figure 2:
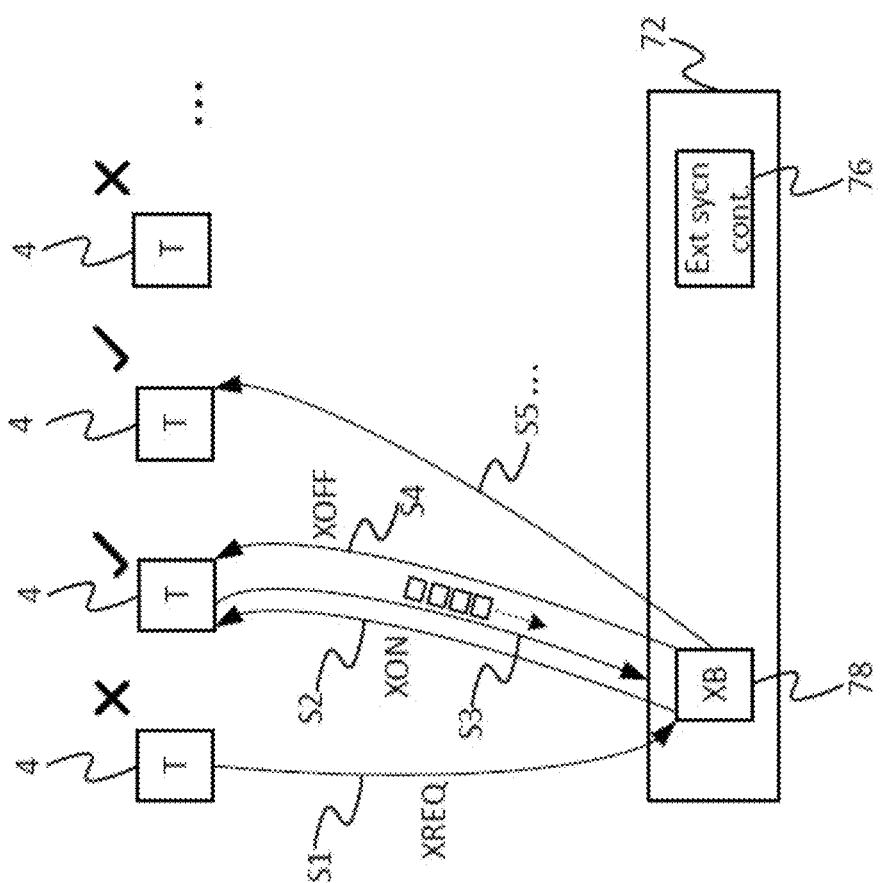
FIG. 2 illustrates an arrangement for sending data packets off chip from tiles.

FIG. 2 illustrates an exemplary mechanism for sending data packets from tiles to destinations external to the processing unit 2. This mechanism is non-time-deterministic. The mechanism is implemented in dedicated hardware logic in the external interconnect 72. Data is sent over the external interconnect 72 in the form of packets. Unlike the packets sent over the internal interconnect 34, these packets have headers: as the order of transmission can change, they require the destination address to be present in the packet header. The external interconnect 72 includes a routing table for statically routing the data packets in dependence upon the headers of the data packets.

At the physical layer, the interconnect mechanism is lossy, but at the transaction layer, the mechanism is not lossy due to the architecture of the link layer: if a packet is not acknowledged it will be resent automatically by the hardware in the interconnect 72. The possibility for loss and resending at the data link layer, however, means that the delivery of data packets over the external interconnect 72 is not time-deterministic. Further, all the packets of a given exchange may arrive together or separated apart in time, and in any order, so the external interconnect uses flow control and queuing. Further, the interconnect may use clock-data-recovery (CDR) technology to infer a clock from a received data stream having sufficient data signal transitions to maintain bit-lock. This inferred clock will be of unknown phase relationship to the sending clock and hence represent an additional source of non-determinism.

As illustrated, the external interconnect 72 comprises an external exchange block (XB) 78. The compiler nominates one of the tiles 4 to send an external exchange request (XREQ) to the exchange block 78 (operation S1). The XREQ is a message comprising one or more control packets, indicating which of the tiles 4 have data packets (content) to send. This is illustrated schematically in FIG. 4 by the ticks and crosses: by way of an example scenario, those labelled with a tick have data packets to send externally and those labelled with a cross do not. In operation S2, the exchange block 78 sends an exchange-on (XON) control packet to a first of the tiles 4 with packets to send externally. This causes the first tile to start sending its packets to the relevant destination via the external interconnect 72 (operation 53), The packets received from the first tile 4 at the external interconnect are statically routed to the destination using a routing table in the external interconnect 72, If at any time, the XB 78 is unable to continue sending packets to the interconnect (e.g. due to a previous packet loss and retransmission in the interconnect, or due to over-subscription of the external interconnect by many other XBs and tiles), the XB 78 will send an exchange-off (XOFF) to that tile 4 before the XBs 78 queue overflows. Once the congestion is cleared and the XB 78 again has sufficient space in its queue it will send an XON to the tile 4 allowing it to continue transmitting its content, Once this tile 4 has sent its last packet, then in operation 54 the exchange block 78 sends an exchange-off (XOFF) control packet to this tile 4, then in operation 55 sends another XON to the next tile 4 with packets to send, and so forth. The signalling of XON and XOFF are implemented as a hardware mechanism in dedicated hardware logic in the form of the external exchange block 78.

Although in FIG. 2, only a single exchange block 78 is shown, there may be a plurality of different exchange blocks, with each of the exchange blocks serving a subset of the tiles 4 in the processing unit 2. In an implementation, for example, the integrated circuit in which the processing unit 2 is formed comprises eight exchange blocks, each of which performs the functions shown in FIG. 2 for one-eighth of the tiles 4 in the processing unit. Furthermore, each exchange block may comprise a plurality of distinct circuits (referred to as exchange block contexts), which each perform the operations shown in FIG. 2 for a smaller subset of the tiles 4. For example, each exchange block 78 may comprise 4 exchange block contexts, with each exchange block context being arranged to perform the functions shown in FIG. 2 for one-thirty-second of the tiles 4 in the processing unit 2.

Figure 3:
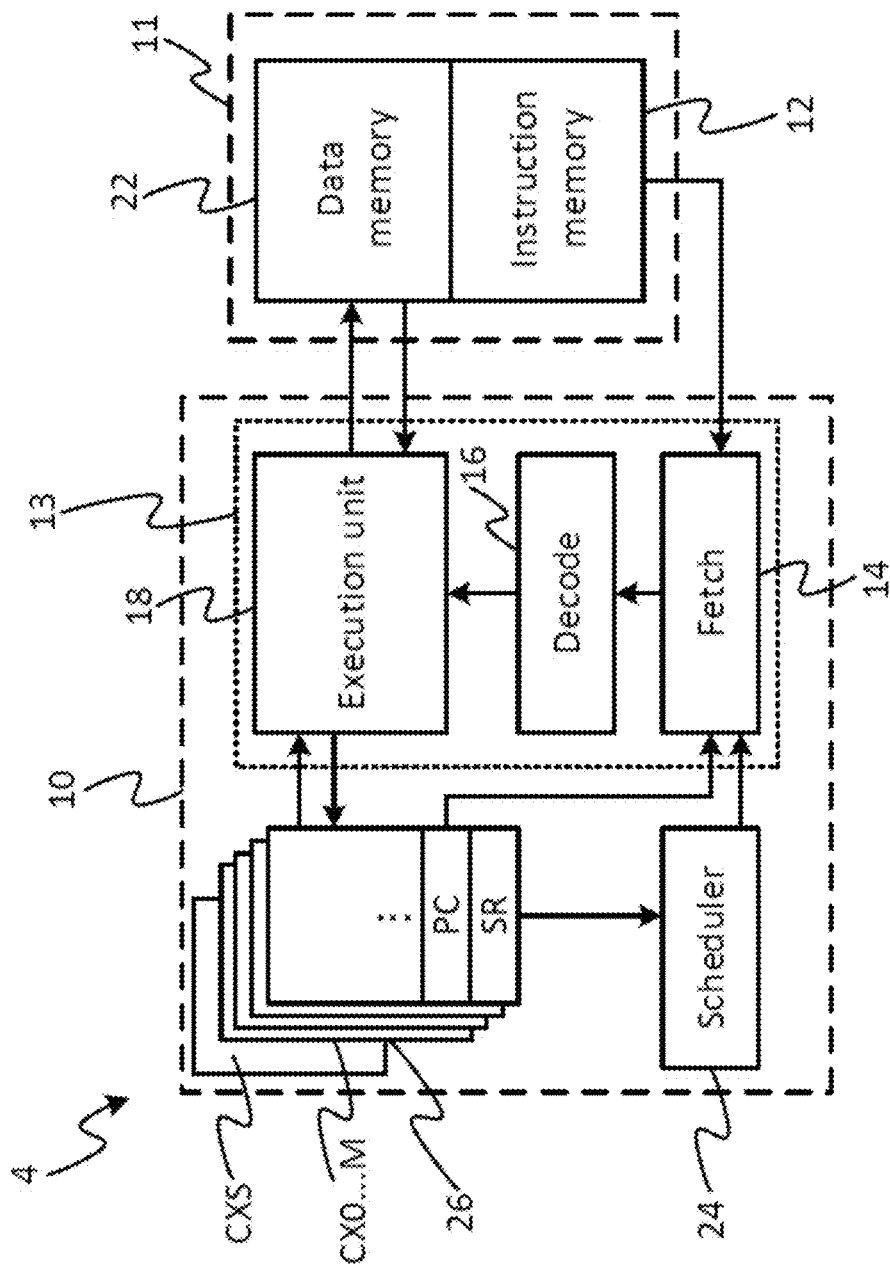
FIG. 3 is a schematic diagram of a tile that forms part of the multi-tile processing unit.

Each of the processor tiles 4 comprises processing circuitry and memory. In some example embodiments, the processing circuitry is a multi-threaded processor 10. FIG. 3 illustrates an example of a processor tile 4 in accordance with embodiments of the present disclosure. The processor tile 4 comprises a multi-threaded processor 10 in the form of a barrel-threaded processor 10, and a local memory 11 (i.e. on the same tile in the case of a multi-tile array, or same chip in the case of a single-processor chip). A barrel-threaded processor 10 is a type of multi-threaded processor 10 in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks, Note that an instruction as referred to herein means a machine code instruction, i.e. an instance of one of the fundamental instructions of the processor's instruction set, consisting of a single opcode and zero or more operands.

Within the processor 10, multiple different ones of the threads from the instruction memory 12 can be interleaved through a single execution pipeline 13 (though typically only a subset of the total threads stored in the instruction memory can be interleaved at any given point in the overall program). The multi-threaded processor 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processor 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

It is desirable in some circumstances to provide for the confidentiality of data that is provided for execution on a processing unit 2. Typically, confidentiality is provided by encryption of data. One type of encryption algorithm that is useful for the encryption of large amounts of data is a block cipher encryption, which operates on fixed sized groups of data, referred to as blocks. These blocks are transported in encryption frames, which comprise one or more data packets over which the blocks are spread.

There are different types of block cipher modes of operation, and some of these make use of unique set of data referred to as an initialisation vector. The initialisation vector ensures that different encrypted data is produced from the same unencrypted data by the encryption algorithm. This has the advantage of preventing an attacker from being able to identify patterns in encrypted data.

Figure 4:
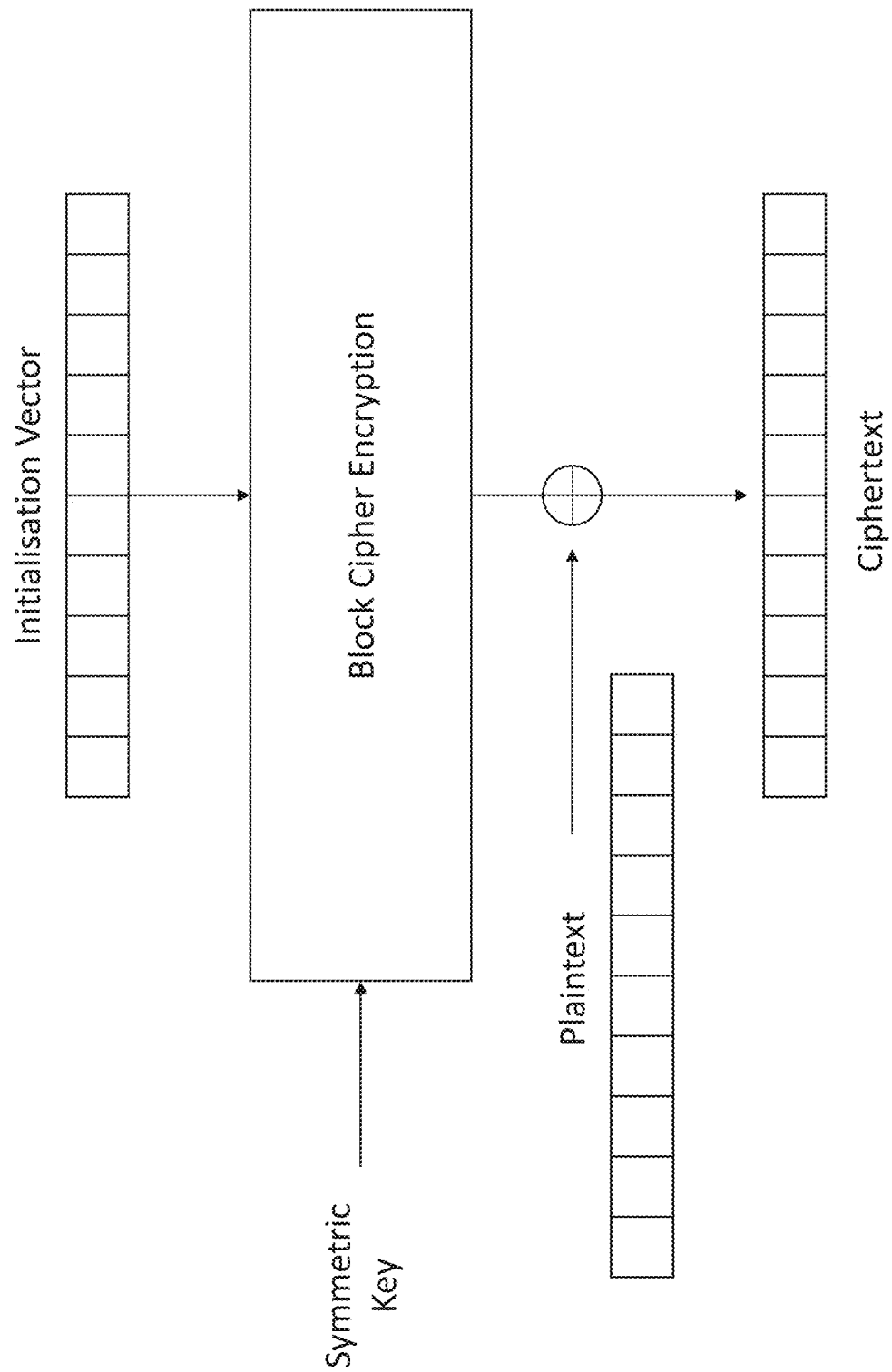
FIG. 4 illustrates a block cipher encryption scheme.

An initialisation vector may be applied in different ways to produce encrypted data. Reference is made to FIG. 4, which illustrates one example of the use of an initialisation vector that is used in example embodiments of the invention. A block of unencrypted data is referred to as a block of plaintext, whereas a block of encrypted data is referred to as a block of ciphertext. As may be observed from FIG. 4, the encryption key is not directly applied to the plaintext. Rather, it is the initialisation vector that is encrypted using the encryption key. The encryption key is a symmetric key. The encrypted Initialisation vector is then XORed with the plaintext to produce the ciphertext. A different initialisation vector would be used in this manner to encrypt each different block of plaintext, thereby hiding patterns in the original data.

Because of the symmetry of the operation shown in FIG. 4, the decryption algorithm is the same as the encryption algorithm. In other words, to obtain the plaintext from the ciphertext, the ciphertext is XORed with the encrypted form of the initialisation vector to obtain the plaintext.

Although FIG. 4 shows an example where the encrypted form of the initialisation vector is XORed with the plaintext, other block cipher modes of operation making use of an initialisation vector may be employed. For example, in another mode of operation, the plaintext may first be XORed with the initialisation vector, with the result of the XOR operation then being encrypted using the encryption key to produce the ciphertext.

There are different types of block cipher encryption by which a key may be applied to encrypt data, such as the initialisation vector, as part of a block cipher. One widely used standard for this purpose is the Advanced Encryption Standard.

Therefore, block ciphers provide for effective encryption of large amounts of data. As well as providing a set of encrypted data, in order to ensure integrity and authentication of data, a sender may also provide, along with the encrypted data, a message authentication code (MAC). The MAC allows a recipient to determine the sender of the data and to detect any changes to the data.

A MAC is produced in dependence upon a set of plaintext or ciphertext blocks. The calculation of the MAC may also be performed in dependence upon each of the initialisation vectors used to perform encryption/decryption processing for each of these blocks. The resulting combination of the blocks and the MAC are transmitted together in one or more packets, which is referred to as an encryption frame. Thus an encryption frame comprises one or more blocks (which may be ciphertext blocks or plaintext blocks) and a MAC, with the MAC being calculated in dependence upon all of the blocks of the encryption frame to which it belongs.

In embodiments of the application, the MAC may be a Galois Message Authentication Code (GMAC) that is calculated in accordance with Galois/Counter Mode (GCM) operation.

Figure 5:
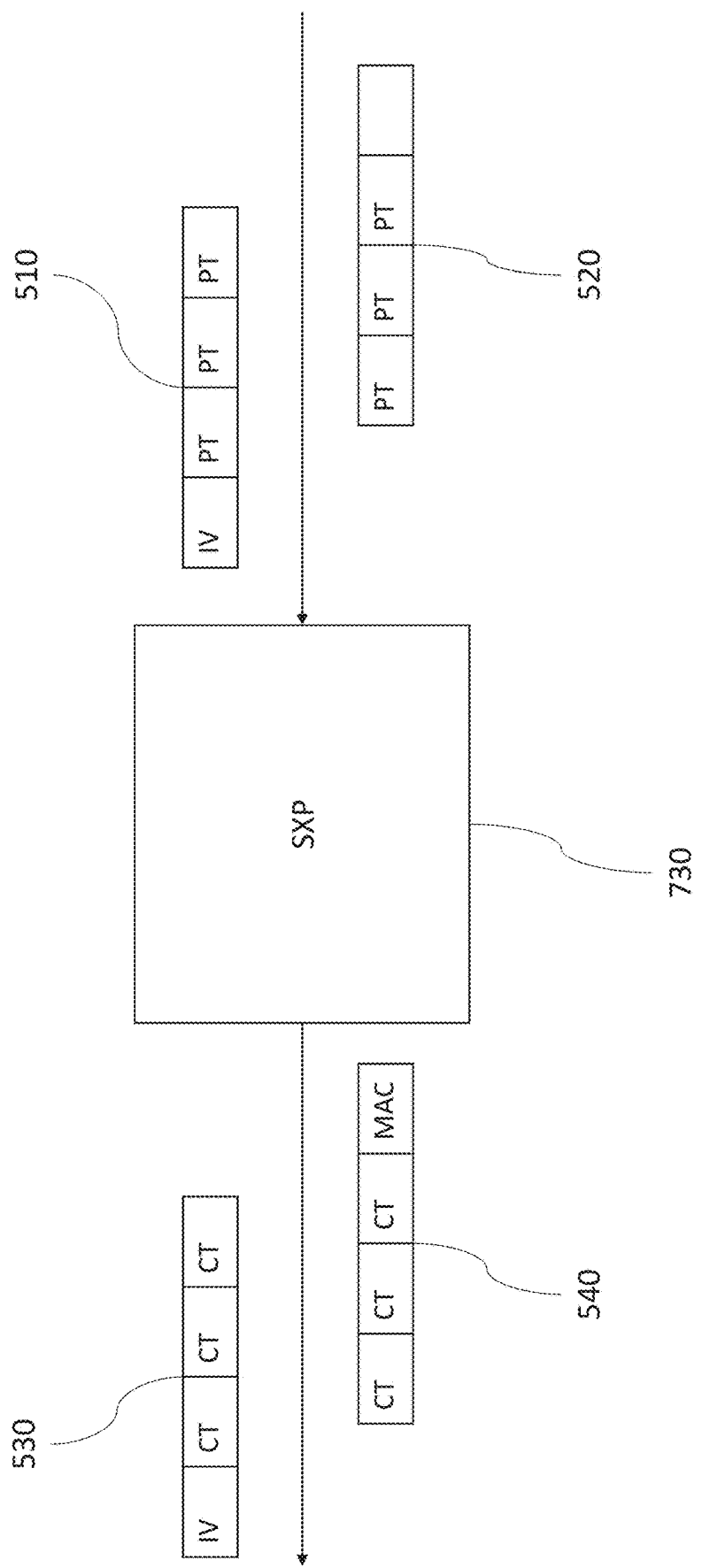
FIG. 5 is diagram illustrating the processing of write requests by the SXP.

Reference is made to FIG. 5, which illustrate how write request data packets may be processed by an encryption unit 730 according to embodiments of the invention. The encryption unit 730 may be referred to as the secure exchange pipeline (SXP) 730. The SXP 730 may implement the encryption algorithm shown in FIG. 4.

A first write request 510 and further write request 520 are shown in FIG. 5. For simplicity, the headers of these packets are not shown. The write requests 510, 520 each comprise a plurality of plaintext blocks, labelled as "PT". The SXP 730 is configured to determine a single MAC for all of the plaintext blocks in the two write requests 510, 520. Therefore, the write requests 510, 520 together represent a write encryption frame.

Included in the first write request 510 is part of an initialisation vector (shown as IV) used for encrypting each of the plaintext blocks in the write encryption frame. The SXP 730 is configured to complete the IV using a counter value. Since the IV must be different for each plaintext block that is encrypted, the SXP 730 increments the counter value for each plaintext block in the write encryption frame. The IV used to encrypt a particular plaintext block is formed by concatenating the counter value associated with the relevant plaintext block with the part of the IV received in the first write request 510.

The further write request 520 contains padded zero bits following the final plaintext in that packet. These bits provide space for the MAC that is to be calculated by the SXP 520 and inserted into the write request 520.

The SXP 730 upon receiving the first write request 510 encrypts each of the plaintext blocks in that packet to produce corresponding ciphertext blocks. The SXP 730 also performs authentication operations used for generating the MAC. Since the MAC cannot be finalised until all of the plaintext blocks for the encryption frame have been received at the SXP 730, these authentication operations comprise generating a partial hash in dependence upon each plaintext block in the first write request 510. The MAC may be a Galois Message Authentication Code (GMAC) that is calculated in accordance with Galois/Counter Mode (GCM) operation. In this case, the partial hash is generated in dependence upon the ciphertext blocks, which are themselves generated using the plaintexts in the data packet 510, and in dependence upon the IVs used to generate those ciphertext blocks.

When the SXP 730 receives the write request 520, the SXP 730 performs the encryption operations to generate the ciphertext blocks for each of the plaintexts in that data packet 520. The IV used to generate each block uses the counter maintained for the write encryption frame that is concatenated with the partial IV in packet 510.

The further write request 520 is provided with one or more bits indicating that it is the last write request for the encryption frame, and therefore the MAC should be finalised and inserted into the packet 520. Therefore, having received all of the plaintexts for the write encryption frame, the SXP 730 finalises the MAC for the encryption frame. The SXP 730 generates this MAC using the partial hash calculated when processing the first write request 510 and using the ciphertext blocks produced by encrypting the plaintext in request 520.

The SXP 730 outputs the processed form of the first write request 530 and the processed form of the second write request 540. These contain the generated ciphertext blocks in place of the plaintext blocks. The second write request 540 contains the MAC. The MAC may be used for authentication of the encryption frame when the encryption frame is later read from the memory to which it is to be written.

Figure 6:
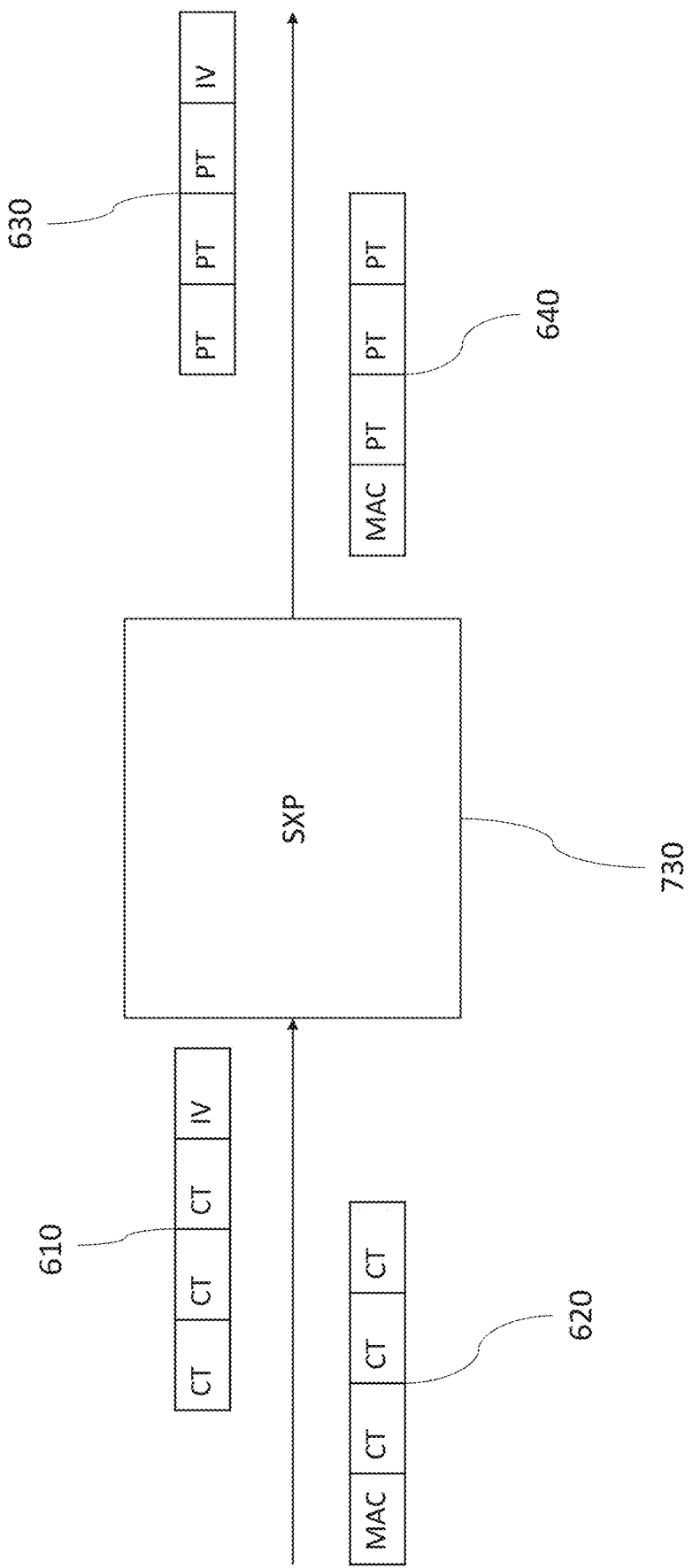
FIG. 6 is diagram illustrating the processing of read completions by the SXP.

Reference is made to FIG. 6, which illustrates how read completion data packets may be processed by the SXP 730.

The SXP 730 receives a first read completion 610 and a second read completion 620. For simplicity, the headers of these packets are not shown. The read completions 610, 620 comprises a plurality of ciphertext blocks, labelled as "CT". The read completion 620 comprises a MAC for all of the ciphertext blocks in the packets 610, 620. Therefore, the read completions 610, 620 together represent a read encryption frame.

Including in the first read completions 610 is part of an initialisation vector (IV) used for decrypting each of the ciphertext blocks in the encryption frame. The SXP 730 is configured to complete the IV using a counter value. Since the IV must be different for each ciphertext block that is decrypted, the SXP 730 increments the counter value for each ciphertext block in the encryption frame. The IV used to decrypt a particular ciphertext block is formed by concatenating the counter value associated with the relevant ciphertext block with the part of the IV received in the first write request 610.

The further read completion 620 contains the MAC for the encryption frame. The SXP 730 is configured to check this MAC in the read completion 620 by recalculating it using the ciphertext blocks in the packets 610, 620 and comparing it to the MAC in the read completion 620.

The SXP 730 upon receiving the first read completion 610 decrypts each of the ciphertext blocks in that packet to produce corresponding plaintext blocks. The SXP 730 also performs authentication operations used for generating the MAC. Since the MAC cannot be finalised until all of the ciphertext blocks for the encryption frame have been received at the SXP 730, these authentication operations comprise generating a partial hash in dependence upon each ciphertext block in the first read completion 610. The MAC may be a Galois Message Authentication Code (GMAC) that is calculated in accordance with Galois/Counter Mode (GCM) operation. In this case, the partial hash is generated in dependence upon the ciphertexts in the data packet 510 and in dependence upon the IVs used to generate the corresponding plaintext blocks.

In processing packet 610, the SXP 730 produces packet 630 containing the decrypted plaintext. The SXP 730 outputs the packet 630 to its destination.

When the SXP 730 receives the read completion 620, the SXP 730 performs the decryption operations to generate the plaintext blocks for each of the ciphertexts in that data packet 620. The IV used to generate each block uses the counter maintained for the read encryption frame that is concatenated with the partial IV in packet 610.

After having received all of the ciphertexts for the encryption frame, the SXP 730 generates the MAC for the encryption frame. The further read completion 520 is provided with one or more bits indicating that it is the last read completion for the encryption frame, and therefore the MAC should be finalised using the ciphertext in the packet 620. The SXP 730 generates this MAC using the partial hash calculated when processing the first read completion 610 and using the ciphertext blocks in data packet 620.

Once the SXP 730 has finalised the MAC, the SXP 730 checks the calculated MAC against the MAC in packet 620. If the MACs match, the SXP 730 outputs the processed form of the further read completion 640. If the MACs do not match, the authentication fails and the data packet 640 is not transmitted. The recipient processor may be programmed so as not to process received data (e.g. the data in packet 630) unless it receives all of the data for the encryption frame (e.g. including data of packet 640). Therefore, if the MAC check fails, the recipient processor will not receive all of the data of the encryption frame and, therefore, will not act on any of the data of the encryption frame.

In embodiments, the data (i.e. the partial IV, CT, and MAC) written to the memory by write requests 530, 540 in FIG. 5 may be the same as the data included in the read completions 610, 620 in FIG. 6. In other words, this data may be written to a memory in write requests 530, 540 and read from that memory in the read completions 610, 620.

Although FIGS. 5 and 6 both illustrate examples where an encryption frame includes two data packets, in other examples an encryption frame may comprise more than two data packets.

Figure 7:
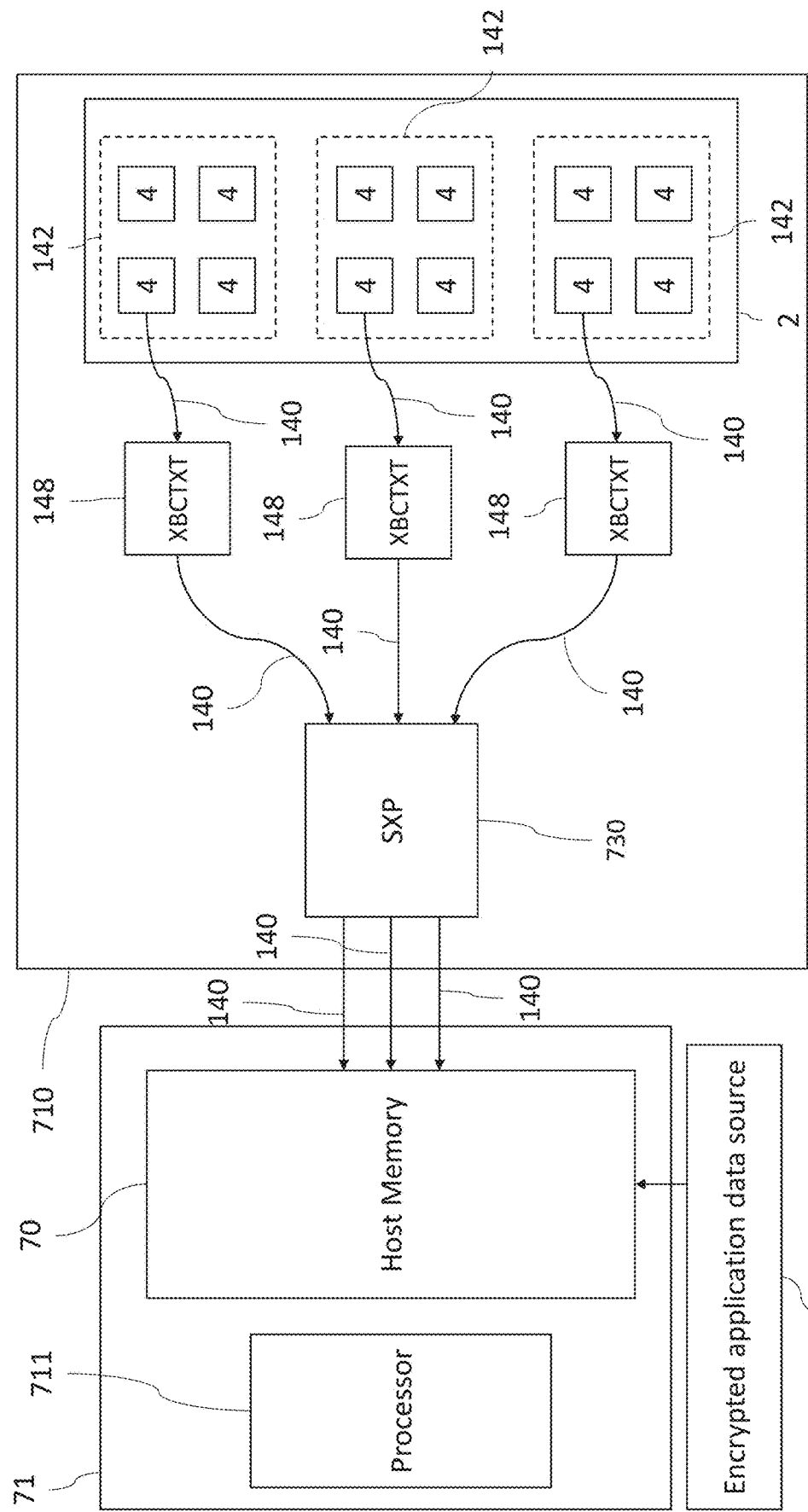
FIG. 7 illustrates the transfer of data between sets of tiles of the processing unit and a host memory.

Reference is made to FIG. 7, which illustrates an example device 710 according to embodiments of the invention. The device 710 is an integrated circuit (i.e. a chip) of which the processing unit 2 is a part. The processing unit 2 is a multi-tile processing unit 2 comprising tile processors 4 as discussed. The tiles 4 are configured to read and write data from a host memory 70 of a host system 71 external to the device 710. The host system 71 is untrusted and is unable to decrypt the application data stored in memory 70.

The host system 71 is connected to a data source 720. The application data source 720 is a further data processing system that is configured to communicate with the processing unit 2 via the host system 71. The application data source 720 provides the compiled executable code that executes on the processing unit 2 by writing this code in encrypted form to the host memory 70. It is also the data source 720 which provides encrypted application data for processing by the processing unit 2 by storing that data in the host memory 70. This data is read by the tiles 4 of the processing unit 2. Additionally, the tiles 4 write their results of processing to the host memory 70. Since the host system 71 is untrusted, the application data and results are encrypted before being sent through the host 71.

The one or more symmetric keys, which are required to encrypt and decrypt the data, are shared between the application data source 720 and the integrated circuit 7:10.

FIG. 7 illustrates how different tiles 4 may exchange data with host memory 70. Various tiles 4 are shown issuing requests 140, which may be read or write requests. Each read/write request 140 comprises an address in memory 70 from which the data is to be read from or to which data is to be written, A tile 4 issues a request 140 to an exchange block context 148, with which it is associated. The request 140 transmitted from the tile 4 in a first packet format (referred to as the Tlink format) and received at an exchange block context 148 in that format. The exchange block context 148 converts the request 140 to a second packet format (referred to as an Elink packet format). When in the Elink packet format, the packet is suitable for transmission to other components of the integrated circuit 710 outside of the processing unit 2.

Each exchange block context 148 is implemented as part of an exchange block 78 illustrated in FIG. 2. Each exchange block context 148 may comprise a dedicated circuit in an exchange block 78 or may be a software module running on processor of an exchange block 78. Each exchange block context 148 controls the sending of data by a set 142 of tiles 4 with which it is associated using the mechanism shown in FIG. 2.

Each request 140 is passed to the SXP encryption hardware 730 that is configured to implement the encryption algorithm. The SXP 730 performs encryption of data written by the tiles 4 to the host memory 70 and decryption of data read from host memory 70 by the tiles 4. Although the SXP 730 described with respect to FIGS. 5 to 9 is described as being a single unit, in embodiments, there may be separate SXPs 730 provided for encryption and decryption of data. The SXP 730 may perform the encryption and decryption operations according to a block cipher encryption scheme, such as the Advanced Encryption Standard (AES).

The requests 140 are sent via the SXP 730 to the host 71. When the data packets are transmitted to the host 71, the packets may be converted to a third format (e.g. PCIe or Ethernet) before being transmitted externally to the chip 710. The host 71 processes these request to service them. For example, if the request is a write request, the host 71 causes the relevant data in the write request to be written to the host memory 70, If the request is a read request, the host 71 causes the data to be read from the host memory 70 and returned to the tile 4 that issued the read request in a plurality of read completions. The read completions are returned to the tile 4 along the same path via which the read request was sent, i.e. from the host 71 to the SXP 730 to the associated exchange block context 148 and finally to the tile 4.

As described above with respect to FIGS. 5 and 6, an encryption frame may span multiple packets. In this case, after having performed the processing associated with a first packet (which may be a read completion or a write request) for the encryption frame, the SXP 730 maintains state information associated with the encryption frame, such that when subsequent packets are received, those packets may be processed using this state information. The state information may include a partial hash for determining the MAC for the encryption frame. The state information may include an IV that is incremented for each of block of data received.

At certain points in the system shown in FIG. 7, requests and completions are guaranteed to be in order. Any write requests transmitted from a single tile 4 will be received at the host 71 in the order in which they are transmitted by the tile 4. Similarly, any read completions sent by the host 71 to a single tile 4 will be received at the SXP 730, and later at the tile 4, in the same order they are dispatched from the host 71. However, read completions returned in response to different read requests may be interleaved at the SXP 730, such that order cannot be guaranteed for completions issued in response to different requests. Similarly, write requests issued by different tiles 4 may be interleaved at the SXP 730, such that order cannot be guaranteed for write requests issued by different tiles 4.

In order to handle interleaved read completions and interleaved write requests, multiple sets of state information may be maintained in the SXP 730. Each set of state information is associated with one or more sets 142 of the tiles 4 and is used to perform encryption or decryption operations for those tiles 4. Separate sets of state information are provided for processing write requests and for processing read completions. In embodiments, these are provided in separate SXPs 730, with one such SXP 730 being dedicated to processing read completions and another such SXP 730 being dedicated to processing write requests.

To maintain the separate sets of state information, the SXP 730 provides separate context storages associated with different sets of tiles 142. Each context storage may store state information associated with one or more sets of tiles 142. The separate context storages may be part of the same unified memory, which is operable to store state information for different sets of tiles as described. The discussion of separate context storages reflects the capability of the SXP 730 to store multiple sets of state information.

Figure 8:
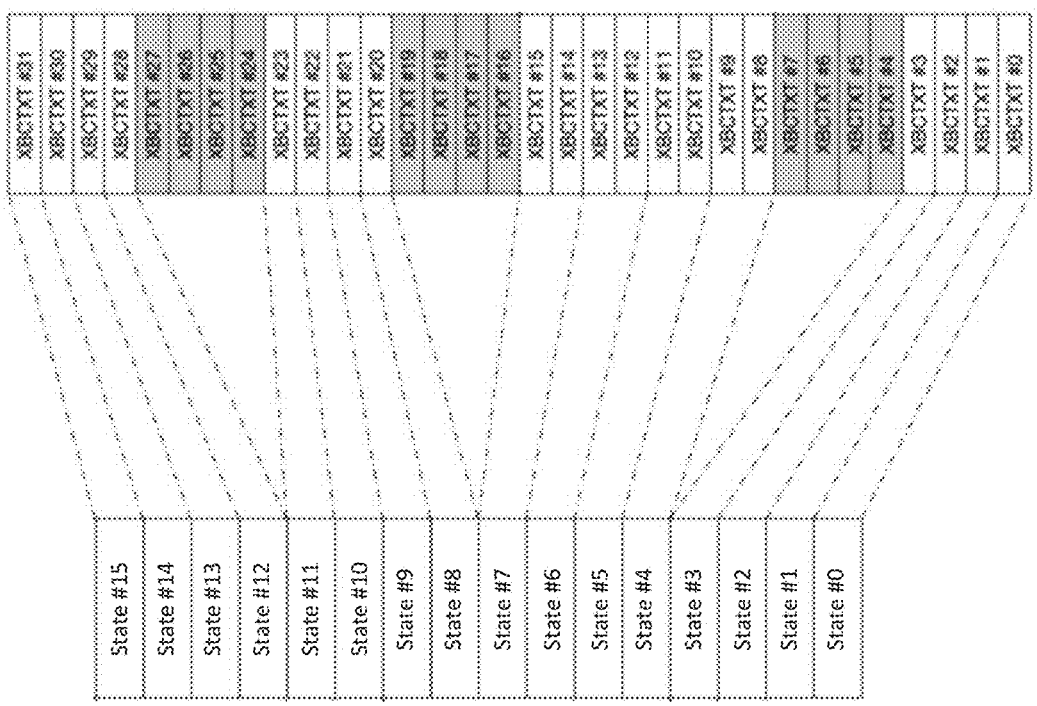
FIG. 8 illustrates an example mapping between different sets of tiles and state information held in the encryption unit.

Each set of tiles 142 may be constrained such that only one tile 4 in a group of tiles 4 associated with a single context storage is permitted to have an outstanding read request open at any one time. This prevents read completions associated with the same context storage from being interleaved. Likewise, each set of tiles 142 may be constrained such that only one tile 4 in a group of tiles 4 associated with a single context storage is permitted to issue write requests at any one time. This prevents write requests associated with the same context storage from being interleaved. Reference is made to FIG. 8, which illustrates a mapping between sets of tiles 142 (which are each associated with a different exchange block context) and different context storages. The context storages are indicated in FIG. 8 with labels for the sets of state information (state #0 to #15), which they are operable to store. The mapping between sets of tiles 142 and context storages as illustrated in FIG. 8 may apply for handling read completions or write requests.

There are three different cases shown in FIG. 8 that may apply for a set of tiles 142. A first case is that a set of tiles 142 may be associated with its own dedicated context storage held in the SXP 730. This applies to the set of tiles 142 associated with the exchange block context XBCTXT #31 which, as shown, is associated with a single context storage operable to store a set of state information (State #15). If the mapping shown in FIG. 8 applies to read requests, the set of tiles 4 associated with XBCTXT #31 is constrained such that only one of these tiles 4 may have an outstanding read request open at any one time. If the mapping shown in FIG. 8 applies to write requests, the set of tiles 4 associated with XBCTXT #31 is constrained such that only one of these tiles 4 may send write requests of a write encryption frame at any one time.

A second case, which is shown in FIG. 8, is that a set of tiles 142 is not associated with any context storage held in the SXP 730. This is the case for the set of tiles 142 associated with exchange block context XBCTXT #27. As shown, the SXP 730 is not configured to store state information associated with this set of tiles 142 associated with exchange block context XBCTXT #27. For such a set of tiles 142, none of the tiles 4 are permitted to issue read/write requests.

A third case, which is shown in FIG. 8, is that multiple sets of tiles 142 are each associated with the same context storage. This is the case for the sets of tiles 142 associated with exchange block contexts XBCTXT #14 and XBCTXT #15, which as shown, are associated with a single context storage operable to store a set of state information (State #7). If the mapping shown in FIG. 8, applies to read requests, only one of the tiles 142 in the multiple sets of tiles 142 associated with this single context storage is permitted to have a read outstanding at any one time. If the mapping shown in FIG. 8 applies to write requests, only one of the tiles 142 in the multiple sets of tiles 142 associated with the single context storage is permitted to issue write requests at any one time.

To apply the constraint that only one of the tiles 4 in a set 142 may send write requests at any one time, the scheme shown in FIG. 4 may be used. When a tile 4 has write requests to send, its exchange block context 148 sends an XON message to that tile 4. Once those write requests are sent, the exchange block context 148 sends an XOFF message to the tile 4, and then sends an XON message to the next tile 4 with data to send. This constraint may be implemented between a group comprising multiple sets of tiles 142 that share the same exchange block 78 by introducing communication between the exchange block contexts 148 belonging to that exchange block 78. In this way, the constraint may be applied that only one tile in multiple sets 142 associated with a single context storage may have an open write encryption frame at any one time.

For the read requests, the exchange block context 148 may implement the constraint by issuing an XON message to a tile with a read request to send. When all of the read completions corresponding to that read request are received by the exchange block context 148, the exchange block context 148 may issue an XON message to another tile 4 with a read request to send.

Therefore, constraints are introduced into the system, such that it is not possible for every tile 4 of the processing unit 2 to read or write data at the same time. This constraint may be introduced, however, without limiting the bandwidth of reading and writing to host memory 70. In embodiments, the aggregate read/write bandwidth provided by the tiles 4 (i.e. the bandwidth that would be possible if all tiles 4 were reading/writing at the same time) may be much greater than the maximum possible bandwidth of the link between the chip 710 and the host 71. Therefore, in such an embodiment, even were the constraint removed such that all tiles 4 may read/write data simultaneously, the total rate of data transfer between the chip 710 and the host 71 would not be improved. However, sufficient state information is held in the SXP 730 to enable a number of tiles 4 to read/write data simultaneously, whilst not exceeding the maximum possible bandwidth of the link between the chip 710 and the host 71.

Figure 9:
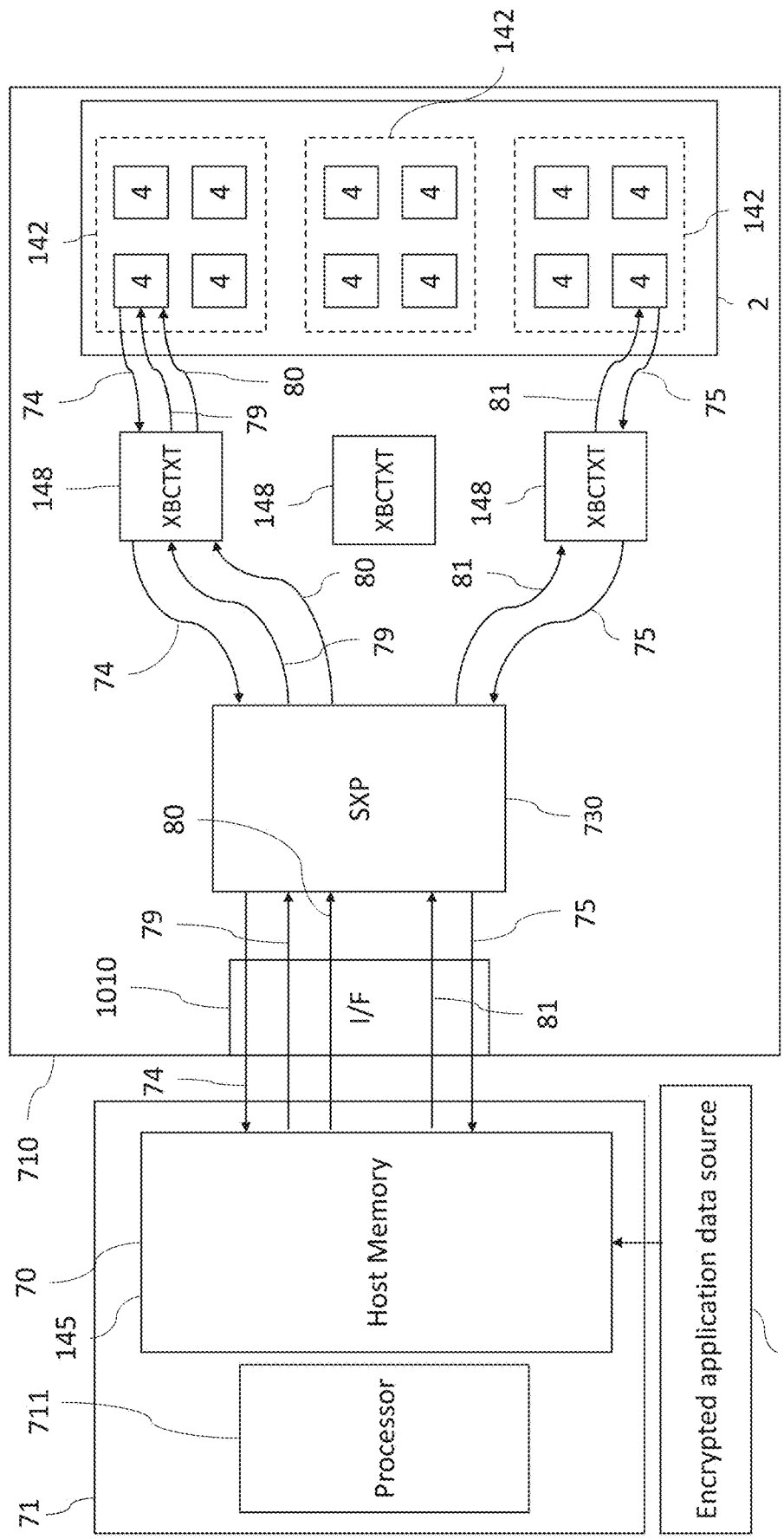
FIG. 9 illustrates the reading of data by different sets of tiles from an external storage, where the read competitions have become interleaved.
Figure 10:
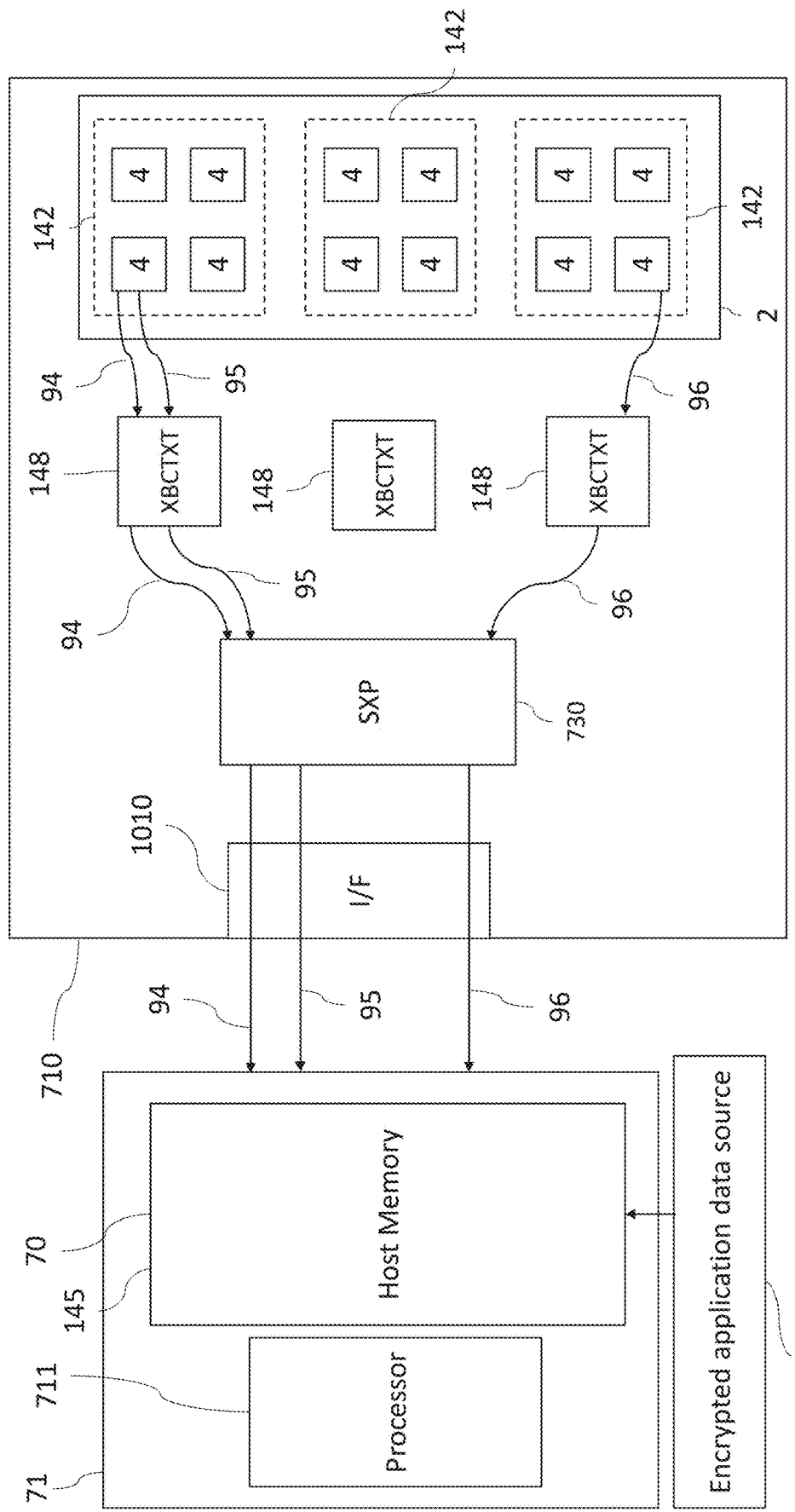
FIG. 10 illustrates the writing of data to external storage by different sets of tiles, where the write requests have become interleaved.

More specific examples will now be described with reference to FIGS. 9 and 10. FIG. 9 illustrates the handling of interleaved read completions. FIG. 10 illustrates the handling of interleaved write requests.

Reference is made to FIG. 9, which illustrates the issuance of read requests by tiles 4 to a storage external to the processing unit 2. In the example shown in FIG. 9, the external memory is a host memory 70, but could also be another type of storage.

A tile 4 is shown issuing a first read request 74. This first read request 74 is sent to the SXP 730. No other tiles 4 in the set 142 from which the first read request 74 originated may send a read request until the completions are returned.

When the SXP 730 receives the first read request 74, the SXP 730 inserts a bit into the read request 74 indicating that the data to be read requires decryption (this bit may be referred to as the encryption bit).

The read request 74 is passed from the SXP 730 to the interface 1010. The interface 1010 may include a PCIe controller and coverts read requests to PCIe read requests for dispatch to the host 71. In some embodiments, the SXP 730 may be incorporated as part of the interface 1010 rather than being a separate entity as shown in FIG. 9.

The interface 1010 removes certain information from the read request 74 and stores this in a look up table. The interface 1010 stores the encryption bit into the look up table. The interface 1010 stores an identifier of the tile 4 to which the data is to be returned into the look up table. The tile 4 to which data is to be returned in response to the read request 74 is the same as the tile 4 that issued the request. The interface 1010 stores the tile memory address to which the requested data is to be returned. The information that is stored in the look up table is associated with a read completion identifier tag that matches the returned read completions to the associated information in the table.

The processor 711 of the host 71 processes the read request 74 and produces a plurality of read completions. Together, the plurality of read completions that are returned in response to a single read request 74 form an encryption frame comprising a plurality of ciphertext blocks and a MAC for those blocks. Each read completion comprises at least one ciphertext.

The read requests (e.g. read request 74) issued by the tiles 4 may have sizes from between 4 bytes up to 1 KB, where all transaction sizes above 64 bytes are integer multiples of 64 bytes. The read completions (e.g. read completions 79, 80) may be provided with a read completion boundary (RCB) of 64 bytes or 128 bytes. If the RCB is 64 bytes, the data returned from addresses in memory 70 that cross a 64 byte address boundary may be fragmented into multiple completions, which each begin at 64 byte aligned addresses. Similarly, if the RCB is 128 bytes, the data returned from addresses in memory 70 that cross a 128 byte address boundary may be fragmented into multiple completions, which each begin at 128 byte aligned addresses.

A first read completion 79 is shown being returned in FIG. 9. The first read completion 79 is returned to the interface 1010. The interface 1010 converts the first read completion 79 from a PCIe read completion to an Elink read completion. The interface 1010 matches an identifier of the read completion 79 in the table to look up the information that was stored in the look up table by the interface 1010 from the associated read request 74. The interface 1010 inserts this information into the header of the read completion 79.

The interface 1010 provides the first read completion 79 to the SXP 730. The first read completion 79 may be the same as the read completion 610 shown in FIG. 6 and processed by the SXP 730 in the same way. The SXP 730 uses at least one IV and a stored symmetric key and to decrypt ciphertext data in the read completion 79. The initialisation vector may be determined by the SXP 730. The SXP 730 also uses the ciphertext data and the IV to generate a partial hash for determining the MAC. After decrypting the ciphertext data, the SXP 730 causes the first read completion 79 containing the decrypted data to be returned to the tile 4 from which the read request 74 originated.

The SXP 730 stores state information associated with the decryption and authentication of the ciphertext returned in response to the read request 74. Since the SXP 730 comprises a context storage associated with the one or more sets of tiles 142 from which the read request 74 originated, the storing of the state information comprises storing the state information associated with those one or more sets of tiles 142 to that context storage. This may comprise overwriting previously held state information for those sets of tiles 142.

The host 71 also provides one or more further read completions 80 that are sent after the first read completion 79. The one or more further read completions 80 are transferred to the SXP 730 in the same manner as the first read completion 79. The one or more further read completions 80 may be the same as the read completion 620 described above and may be processed in the same way by the SXP 730. The one or more further read completions 80 comprise the remaining one or more ciphertext blocks for the encryption frame. The SXP 730 performs the decryption operations for decrypting the ciphertext in the one or more further read completions 80. These operations make use of the state information stored in the SXP 730 when the first read completion 79 was processed. For example, the state information may comprise an IV, which is incremented for every ciphertext block processed in the completions 79, 80. The final value of the IV after decrypted each of the ciphertext blocks in the completion 79 forms the state information, which is used for decrypting the ciphertext in the one or more further read completions 80.

After decrypting the ciphertext in each of the read completions 80, the SXP 730 sends the read completions 80 containing the decrypted data to the tile 4 from which the read request 74 originated. The SXP 730 will, however, only transmit the last of the read completions 80 after having performed the MAC check.

When it receives the last of the read completions 80, the interface 75 sets a bit (referred to as the cc bit) in the last of the completions 80 to indicate that that completion is the last of the completions for the encryption frame. This allows the SXP 730 to identify the final packet of the frame and thereby check the MAC contained in the final packet.

The SXP 730 also checks the MAC, which is transmitted in the last of the read completions 80, for authentication purposes and to verify that the data has not be altered. The SXP 730 performs this check by recalculating the MAC using the blocks in the encryption frame.

Having checked the MAC, the SXP 730 provides the last of the completions 80 comprising decrypted application data to the tile 4 that issued the read request 74.

When providing each of the read completions 79, 80 to the relevant tile 4, the exchange block context 148 examines the tile identifier contained in the completions 79, 80 and, in dependence upon this identifier, routes the completions 79, 80 to the identified one of the tiles 4. The exchange block context 148 also converts the packets 79, 80 from the Elink to the Tlink packet format before delivery to the identified one of the tiles 4.

FIG. 9 also shows a further tile 4 issuing a second read request 75. This second read request 75 is transmitted at a similar time to the first read request 74, such that both are outstanding at the same time. The second read request 75 will be processed in the same way as the first read request 74, with a second read completion 81 being returned to the tile 4 that issued the second read request 75. A different set of state information for processing the completions returned in response to the read request 75 is maintained in the SXP 730. This state information is associated with the set of tiles 142 from which the second read request 75 was issued. Since different sets of state information are provided for processing read requests from different sets of processors 142, the second read completion 81 may become interleaved with the read completions 79, 80, without reordering of the read completions 79, 80, 81 being necessary.

When the first read completion 79 is processed by SXP 730, state information associated with the set of tiles 142 from which the read request 74 originated is stored in the SXP 730. When the second read completion 81 is received at the SXP 730, the state information generated by processing the first read completion 79 is saved and state information associated with set of tiles 142 from which the request 75 originated is generated by processing the read completion 81. When the one or more further read completions 80 are received, the state information generated by processing read completion 81 is saved, and the state information generated by processing read completion 79 is loaded and used for processing the one or more further read completions 80.

Reference is made to FIG. 10, which illustrates the issuance of write requests by tiles 4 to a storage external to the processing unit 2. In the example shown in FIG. 10, the external memory is a host memory 70, but could also be another type of storage.

The write requests that are issued by the tiles 4 may be between 4 bytes and 256 bytes in size. All transaction sizes above 64 bytes are integer multiples of 64 bytes. All write transactions from a given tile 4 will remain in order between the tile 4 and the host 71.

A tile 4 is shown as dispatching a first write request 94. The first write request 94 is a first part of an encryption frame and comprises a first plaintext to be written to host memory 70. As with the read completions described above, the write request 94 is part of an encryption frame comprising a number of packets.

The first write request 94 is in the Tlink packet format. The first write request 94 is delivered to the associated exchange block 78, which converts the first write request 94 from the Tlink packet format to the Elink packet format. The first write request 94 is then provided to the SXP 730. The write request 94 may be the same as the write request 510 and may be processed by the SXP 730 in the same way.

The SXP 730 is configured to encrypt the plaintext contained in the first write request 94. The SXP 730 encrypts this data using an initialisation vector. The SXP 730 may determine the initialisation vector to use by incrementing a counter for each plaintext in the packet 94 as described with respect to FIG. 5. The SXP 730 in parallel with the ciphertext generation, also performs operations to generate the MAC. The SXP 730 stores state information associated with the set of tiles 142 stored in the SXP 730. The storing the state information may comprise overwriting part of the state information used for processing a previous write encryption frames received from a tile 4 associated with the same context storage as the tile 4 from which the request 94 originated.

The SXP 730 sends the first write request 94 to the interface 1010. The interface 1010 receives the first write request 94 from the SXP 730 and converts it to a PCIe write request. The interface 75 causes the write request 94 to be sent to the host 71. The host processor 711 causes the encrypted data to be written to the host memory 70 at the memory address indicated in the first write request 94.

One or more further write requests 95 are also dispatched from a tile 4. This one or more further write requests 95 are also provided to the SXP 730. The one or more further write requests 95 comprising the remaining further plaintext. The SXP 730 uses the state information produced when the first write request 94 was processed to encrypt the plaintext in the second write request 95, The SXP 730 also uses the updated state information to perform further operations to generate the MAC using state, e.g. a partial hash, that was generated when processing the write request 94. The one or more further requests 95 may be the same as write request 520 and may be processed in the same way.

The write requests are dispatched in a given sequence. The last of the write request has a bit (the cc bit) set to indicate to the SXP 730 the last of the packets in the sequence, allowing the SXP 730 to determine that the MAC should be inserted into this packet.

The SXP 730 inserts the calculated MAC into the last of the write requests 95, and dispatches this to the host 71. The host 71 will store the ciphertext along with the calculated MAC in the host memory 70.

FIG. 10 also shows a further tile 4 issuing a second write request 96. This second write request 96 is transmitted at a similar time to the write requests 94, 95, such that these write requests become interleaved at the SXP 730. The second write request 96 will be processed in the same way as described above for the write requests 94, 95. A different set of state information for processing the one or more further write requests 96 is provided in the SXP 730. This state information is associated with the set of tiles 142 from which the write request 96 was issued. Since different sets of state information are provided for processing write requests from different sets of processors 142, the one or more further write requests 96 may become interleaved with the write requests 94, 95, without reordering of the write requests 94, 95, 96 being necessary.

When the first write request 94 is processed by SXP 730, state information associated with the set of tiles 142 from which the write request 94 originated is stored in the SXP 730. When the second write request 96 is received at the SXP 730, the state information generated by processing the first write request 94 is saved and state information associated with the set of tiles 142 from which write request 96 originated is generated by processing write request 96. When the one or more further write requests 95 are received, the state information generated by processing the second write request 96 is saved, and the state information generated by processing write request 94 is loaded and used for processing the one or more further write requests 95.

Figure 11:
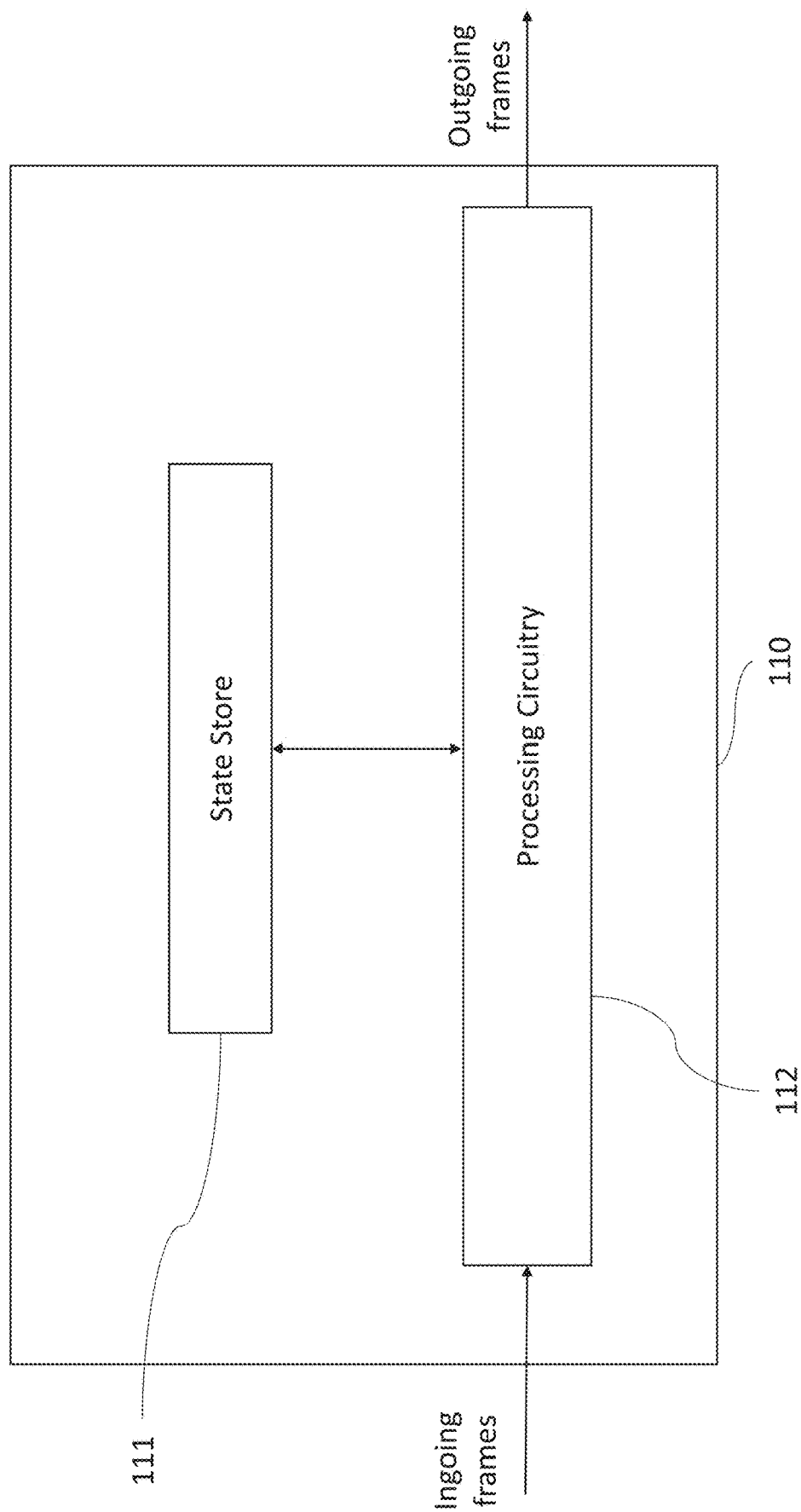
FIG. 11 is a schematic diagram of the encryption hardware used to encrypt data written by tiles to external storage and decrypt data read from the external storage.

Reference is made to FIG. 11, which illustrates an example of the SXP 730 that may be used in embodiments of the application. The SXP 730 comprises processing circuitry 112 that may be used for decrypting data (e.g. in read completions) or for encrypting data (e.g. in write requests), and for checking the MAC (e.g. in read completions) or generating the MAC (e.g. for write requests). The processing circuitry 112 may comprise a processor configured to execute computer readable instructions to perform the operations described. Additionally or alternatively, the processing circuitry 112 may comprise a field programmable gate array (FPGA) or application specific integrated circuit (ASIC) for performing the operations.

The processing circuitry 112 may provide a pipeline for processing one or more of the data packets simultaneously. For example, the processing circuitry 112 may perform MAC generation operations associated with one write request/read completion, whilst performing encryption/decryption operations associated with another write request/read completion.

A state store 111 comprises the context storages for holding different sets of state information. When a packet (either a write request or a read completion) is received, the processing circuitry 112 loads state information from the state store 111 for performing the encryption/decryption processing and authentication operations. The state store 1:1:1 may comprise a unified memory or may comprise physically separate memories.

Suppose a write request data packet is received at the circuitry 112. The write request is received from a tile 4 and is a request to write to a certain location in memory 70. This write request is a first packet of an encryption frame. The data requires encryption by the circuitry 112. The circuitry 112 performs certain operations to generate the encrypted data from one or more plaintext blocks in the write request. These operations may include the encryption of the initialisation vector and the XOR operations between corresponding bits of the encrypted initialisation vector and the plaintext. In processing the plaintext blocks, the IV is incremented. The final IV value when the write request has been processed represents state information associated with the encryption frame.

Similarly, the circuitry 112 may perform some of the operations for generating the MAC, but is unable to complete these operations until the full frame is received. State information (e.g. a partial hash) associated with the MAC generation is generated as part of the process performed by the circuitry 112 with respect to the first packet of the frame.

If the next packet received at the SXP 730 does not belong to the same encryption frame as the first write request packet discussed above, the circuitry 112 saves the state information associated with this first frame to the state store 111 and performs processing for the next packet. When at a later time, remaining write request packets belonging to the same frame as the first write request are received by the SXP 730, the circuitry 112 loads the state information associated with that frame from the state store 111, The circuitry 112 uses the loaded state information to generate the ciphertext blocks from the plaintext blocks in the remaining write requests. The circuitry 112 also uses the state information to complete the MAC generation process.

A similar process may be carried out in the case that the SXP 730 shown in FIG. 11 is used for decryption of data provided in read completions that are provided to the tiles 4. In embodiments, separate SXPs 730 are provided for decryption and encryption of data.

When a first read completion of an encryption frame is received at the SXP 730, the SXP 730 performs operations to decrypt the ciphertext present in the read completion and to generate the MAC such that the MAC in the encryption frame may be checked. As part of these processes, certain state information may be generated by the circuitry 112 when processing the read completions. The state information comprises state information (e.g. the IV) associated with the decryption operations and state information (e.g. the partial hash) associated with the MAC generation operations.

If the next packet received at the SXP 730 does not belong to the same encryption frame as the first read completion discussed above, the circuitry 112 saves the state information associated with the frame to the state store 111 and performs processing for the next packet. When at a later time, one or more remaining read completion packets belonging to the same frame as the first read completion are scheduled for processing by the SXP 730, the circuitry 112 loads the state information associated with that frame from the state store 111. The circuitry 112 loads the state information associated with performing decryption and MAC generation. The circuitry 112 uses the state information to complete the decryption process. The circuitry 112 also uses the state information to complete the MAC generation process.

Figure 12:
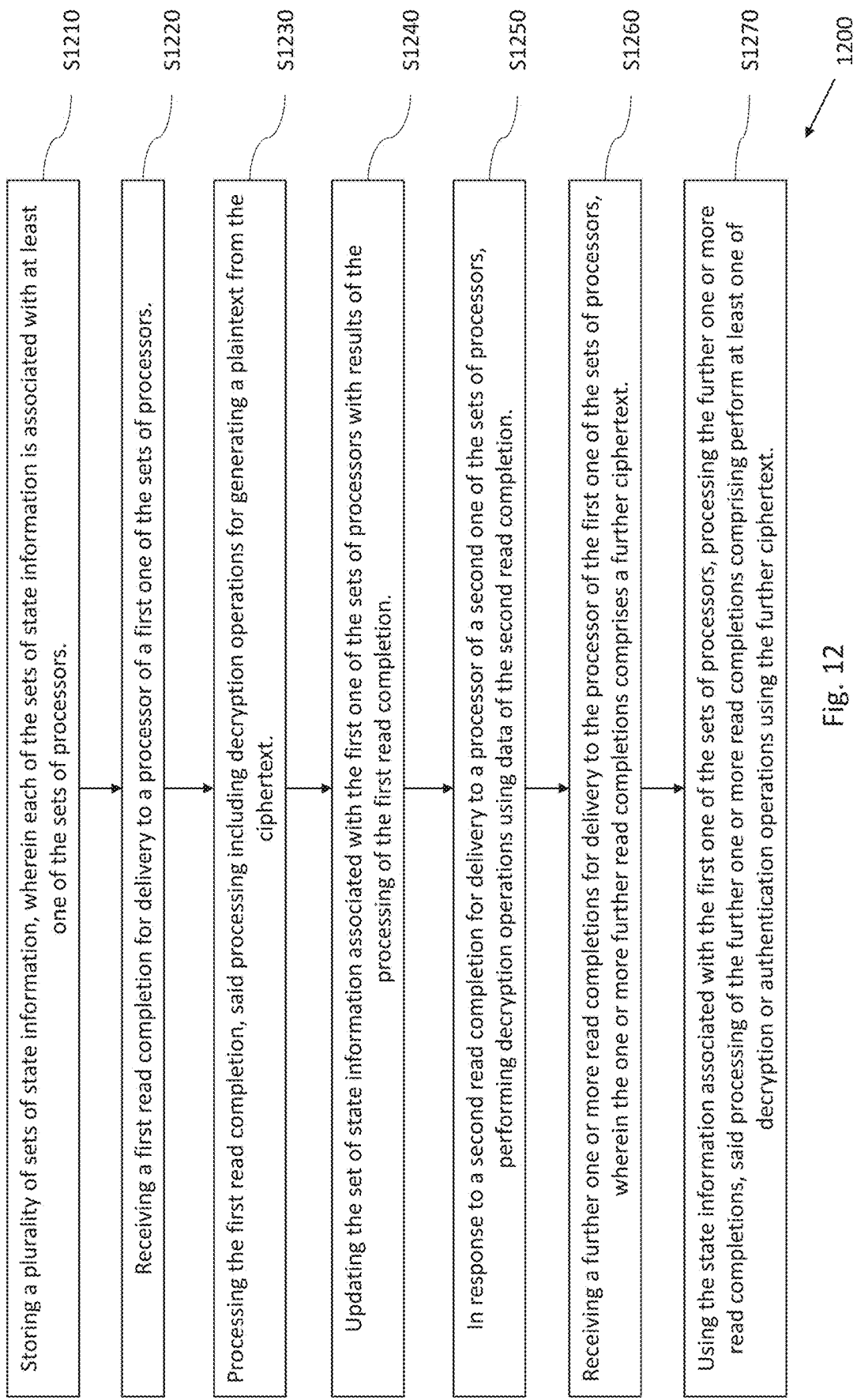
FIG. 12 is a method for handling interleaved read completions using state information associated with different sets of tiles.

Reference is made to FIG. 12, which illustrates a method 1200 for decrypting data from the external storage (e.g. the host memory 70).

At S1210, the at least one encryption unit (e.g. the SXP 730) stores a plurality of sets of state information, wherein each of the sets of state information is associated with at least one of the sets of processors. These sets of state information stored by the SXP 730 are generated as the SXP 730 processes different read completions, as exemplified by the remaining steps of the method 1200.

At S1220, the at least one encryption unit receives a first read completion for delivery to a processor of a first one of the sets of processors.

At S1230, the at least one encryption unit processes the first read completion. This processing includes performing decryption operations for generating a plaintext from the ciphertext.

At S1240, the at least one encryption unit updates the set of state information associated with the first one of the sets of processors with results of processing the first read completion.

At S1250, the at least one encryption unit, in response to receiving a second read completion for delivery to a processor of a second one of the sets of processors, performs decryption operations using data of the second read completion.

At S1260, the at least one encryption unit receives a further one or more read completions for delivery to the processor of the first one of the sets of processors. The one or more further read completions comprise a further ciphertext.

At S1270, the at least one encryption unit uses the state information associated with the first one of the sets of processors to perform processing of the further one or more read completions. This processing of the further one or more read completions comprises performing at least one of decryption or authentication operations using the further ciphertext.

Reference is made to FIG. 13, which illustrates a method 1300 for encrypting data written to external storage (e.g. the host memory 70).

At S1310, the at least one encryption unit (e.g. the SXP 730) stores a plurality of sets of state information, wherein each of the sets of state information is associated with at least one of the sets of processors. These sets of state information stored by the SXP 730 are generated as the SXP 730 processes different write requests, as exemplified by the remaining steps of the method 1300.

At S1320, the at least one encryption receives a first write request issued by a processor of a first one of the sets of processors, wherein the first write request comprises a plaintext.

At S1330, the at least one encryption unit processes the first write request, said processing of the first write request including performing encryption operations for generating a ciphertext from the plaintext.

At S1340, the at least one encryption unit updates the set of state information associated with the first one of the sets of processors with results of the processing of the first write request.

At S1350, in response to receipt of a second write request issued by a processor of a second one of the sets of processors, the at least one encryption unit performs encryption operations using data of the second write request.

At S1360, the at least one encryption unit receives one or more further write requests issued by the processor of the first one of the sets of processors. The one or more further write requests comprise a further plaintext.

At S1370, the at least one encryption unit uses the state information associated with the first one of the sets of processors to process the further one or more write requests. This processing of the further one or more write requests comprises performing at least one of encryption or authentication operations using the further plaintext.

It will be appreciated that the above embodiments have been described by way of example only.

The invention claimed is:

1. A device comprising:
    a processing unit comprising a plurality of sets of processors, wherein each of the processors is operable to issue read requests to read data from storage external to the processing unit and to receive in response, read completions comprising said data; and
    at least one encryption unit comprising a memory operable to store a plurality of sets of state information, wherein each set of state information is associated with at least one of the sets of processors, wherein the at least one encryption unit comprises processing circuitry configured to:
    receive a first read completion for delivery to a processor of a first one of the sets of processors, wherein the first read completion comprises a ciphertext;
    process the first read completion, said processing including decryption operations for generating a plaintext from the ciphertext;
    store as state information associated with the first one of the sets of processors, data generated from the processing of the first read completion;
    subsequently, in response to a second read completion for delivery to a processor of a second one of the sets of processors, perform decryption operations using data of the second read completion;
    subsequently, receive a further one or more read completions for delivery to the processor of the first one of the sets of processors, wherein the one or more further read completions comprises a further ciphertext; and
    using the state information associated with the first one of the sets of processors, process the further one or more read completions, said processing of the further one or more read completions comprising performing at least one of decryption or authentication operations for the further ciphertext.

2. The device of claim 1, wherein the at least one of decryption or authentication operations comprise authentication operations, the authentication operations comprising operations for generating a message authentication code associated with the ciphertext and the further ciphertext.

3. The device of claim 2, wherein the state information used for performing the authentication operations comprises a partial hash, wherein the processing of the first read completion comprises generating the partial hash using the ciphertext.

4. The device of claim 1, wherein the at least one of decryption or authentication operations comprises decryption operations, the decryption operations comprising generating a further plaintext from the further ciphertext.

5. The device of claim 4, wherein the state information comprises an initialisation vector used for performing the decryption operations.

6. The device of claim 5, wherein the processing circuitry of the at least one encryption unit is configured to, when decrypting each ciphertext block received in the first read completion and one or more further read completions, update the initialisation vector using a counter.

7. The device of claim 1, wherein one or more of the sets of state information are each associated with a plurality of the sets of processors.

8. The device of claim 1, wherein for each of a group of processors associated with a same set of state information, the processors of the respective group are configured to implement a constraint such that only one of the processors of the respective group may have an outstanding read request open at any one time.

9. The device of claim 8, comprising a plurality of exchange circuits, wherein each of the exchange circuits is associated with a set of processors and is configured to enforce the constraint for each of its respective set of processors by granting permission to the processors of its associated set to transmit read requests.

10. The device of claim 1, wherein the device is a subsystem for acting as a work accelerator to a host system coupled to the device, wherein the storage external to the processing unit is memory of the host system.

11. A device comprising:
    a processing unit comprising a plurality of sets of processors, wherein each of the processors is operable to issue write requests to write data to storage external to the processing unit; and
    an encryption unit comprising a memory operable to store a plurality of sets of state information, wherein each of the sets of state information is associated with at least one of the sets of processors, wherein the encryption unit comprises processing circuitry configured to:
    receive a first write request issued by a processor of a first one of the sets of processors, wherein the first write request comprises a plaintext;
    process the first write request, including performing encryption operations for generating a ciphertext from the plaintext;
    store as state information associated with the first one of the sets of processors, data generated from the processing of the first write request;
    receive a subsequent write request issued by the processor of the first one of the sets of processors, wherein the subsequent write request comprises a further plaintext; and
    using the state information associated with the first one of the sets of processors, process the subsequent write request, including performing at least one of encryption or authentication operations using the further plaintext.

12. The device of claim 11, wherein the at least one of encryption or authentication operations comprise authentication operations, the authentication operations comprising operations for generating a message authentication code associated with the plaintext and the further plaintext.

13. The device of claim 12, wherein the state information used for performing the authentication operations comprises a partial hash, wherein the processing of the first write request comprises generating the partial hash using the ciphertext.

14. The device of claim 11, wherein the at least one of encryption or authentication operations comprises encryption operations, the encryption operations comprising generating a further ciphertext from the further plaintext.

15. The device of claim 14, wherein the state information comprises an initialisation vector used for performing the encryption operations.

16. The device of claim 15, wherein the processing circuitry of the encryption unit is configured to when encrypting each plaintext block received in the first write request and the subsequent write request, update the initialisation vector used for encrypting the respective plaintext block using a counter.

17. The device of claim 11, wherein one or more of the sets of state information are each associated with a plurality of the sets of processors.

18. The device of claim 11, wherein for each of the at least one set of processors associated with a same set of state information, the respective processors are configured to implement a constraint such that only one of the processors of the respective at least one set of processors may issue write requests comprising a plaintext block at any one time.

19. The device of claim 18, comprising a plurality of exchange circuits, wherein each of the exchange circuits is associated with one of the sets of processors and is configured to enforce the constraint for its associated set of processors by granting permission to the processors of its associated set to transmit the write requests.

20. The device of claim 11, wherein the device is a subsystem for acting as a work accelerator to a host system coupled to the device, wherein the storage external to the processing unit is memory of the host system.

21. A method for decrypting data read from a storage external to a processing unit comprising a plurality of sets of processors, the method comprising:
   storing a plurality of sets of state information, wherein each of the sets of state information is associated with at least one of the sets of processors;
   receiving a first read completion for delivery to a processor of a first one of the sets of processors, wherein the first read completion comprises a ciphertext;
   processing the first read completion, said processing including decryption operations for generating a plaintext from the ciphertext;
   updating the set of state information associated with the first one of the sets of processors with results of the processing of the first read completion;
   receiving a subsequent read completion for delivery to the processor of the first one of the sets of processors, wherein the subsequent read completion comprises a further ciphertext; and
   using the state information associated with the first one of the sets of processors, processing the subsequent read completion, including performing at least one of decryption or authentication operations using the further ciphertext.

22. A method for encrypting data to be written to a storage external to a processing unit comprising a plurality of sets of processors, the method comprising:
   storing a plurality of sets of state information, wherein each of the sets of state information is associated with at least one of the sets of processors;
   receiving a first write request issued by a processor of a first one of the sets of processors, wherein the first write request comprises a plaintext;
   processing the first write request, said processing of the first write request including performing encryption operations for generating a ciphertext from the plaintext;
   updating the set of state information associated with the first one of the sets of processors with results of the processing of the first write request;
   receiving a subsequent write request issued by the processor of the first one of the sets of processors, wherein the subsequent write request comprises a further plaintext; and
   using the state information associated with the first one of the sets of processors, processing the subsequent write request, including performing at least one of encryption or authentication operations using the further plaintext.

23. A non-transitory computer readable medium storing computer readable instructions, which when executed by at least one processor of at least one encryption unit, cause a method for decrypting data read from a storage external to a processing unit to be carried out, the processing unit comprising a plurality of sets of processors, the method comprising:
   storing a plurality of sets of state information, wherein each of the sets of state information is associated with at least one of the sets of processors;
   receiving a first read completion for delivery to a processor of a first one of the sets of processors, wherein the first read completion comprises a ciphertext;
   processing the first read completion, said processing including decryption operations for generating a plaintext from the ciphertext;
   updating the set of state information associated with the first one of the sets of processors with results of the processing of the first read completion;
   receiving a subsequent read completion for delivery to the processor of the first one of the sets of processors, wherein the subsequent read completion comprises a further ciphertext; and
   using the state information associated with the first one of the sets of processors, processing the subsequent read completion, including performing at least one of decryption or authentication operations using the further ciphertext.

24. A non-transitory computer readable medium storing computer readable instructions, which when executed by at least one processor of at least one encryption unit, cause a method for encrypting data to be written to a storage external to a processing unit to be carried out, the processing unit comprising a plurality of sets of processors, the method comprising:
   storing a plurality of sets of state information, wherein each of the sets of state information is associated with at least one of the sets of processors;
   receiving a first read completion for delivery to a processor of a first one of the sets of processors, wherein the first read completion comprises a ciphertext;
   processing the first read completion, said processing including decryption operations for generating a plaintext from the ciphertext;
   updating the set of state information associated with the first one of the sets of processors with results of the processing of the first read completion;

receiving a subsequent read completion for delivery to the processor of the first one of the sets of processors, wherein the subsequent read completion comprises a further ciphertext; and using the state information associated with the first one of the sets of processors, processing the subsequent read completion, including performing at least one of decryption or authentication operations using the further ciphertext.

\* \* \* \* \*